United States Patent [19]
Tsushima et al.

[11] Patent Number: 6,035,343
[45] Date of Patent: *Mar. 7, 2000

[54] METHOD FOR EXECUTING SOFTWARE FORMED OF SOFTWARE COMPONENTS AND A SYSTEM FOR EXECUTING SUCH SOFTWARE

[75] Inventors: Yasuhito Tsushima; Hiromitsu Harada; Sayoko Yokoyama; Takashi Goto; Norimasa Arase, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/253,860

[22] Filed: Jun. 3, 1994

[51] Int. Cl.[7] ........................................ G06F 9/46
[52] U.S. Cl. ............................................ 709/318
[58] Field of Search .................... 395/650, 700, 395/733, 742, 680, 701; 364/280.8, 280.2; 709/300, 302, 303

[56] References Cited

U.S. PATENT DOCUMENTS

| | | | |
|---|---|---|---|
| 4,068,298 | 1/1978 | Dechant et al. | 707/3 |
| 5,530,868 | 6/1996 | Record et al. | 709/302 |
| 5,668,978 | 9/1997 | Yasutake et al. | 395/500 |
| 5,710,926 | 1/1998 | Maurer | 395/701 |

FOREIGN PATENT DOCUMENTS

| | | |
|---|---|---|
| 14-057335 | 3/1989 | Japan . |
| 2-010430 | 1/1990 | Japan . |
| 2-105222 | 4/1990 | Japan . |
| 2-270025 | 11/1990 | Japan . |
| 3-037721 | 2/1991 | Japan . |
| 3-123923 | 5/1991 | Japan . |
| 3-248237 | 11/1991 | Japan . |
| 3-282733 | 12/1991 | Japan . |
| 4-048330 | 2/1992 | Japan . |
| 4-076768 | 3/1992 | Japan . |
| 4-098529 | 3/1992 | Japan . |
| 4-238534 | 8/1992 | Japan . |
| 4-353926 | 12/1992 | Japan . |

OTHER PUBLICATIONS

"Paradox for Windows" Objectpal Developer's Gurde Borland Inc. 1992, Chapter 2, Chapter 6, pp 160–164, pp 285–304 Chapter 10.

"Paradox for Window's"Objectpal Reference Borland Inc, 1992, pp 174–175.

Klein, Mike, "the Windows messaging system," C Users Journal, v11, n5, p70(9), May 1993.

Primary Examiner—Alvin E. Oberley
Assistant Examiner—St. John Courtenay, III
Attorney, Agent, or Firm—Staas & Halsey LLP

[57] ABSTRACT

An event-driven processing system includes: an input/output device for accepting input and displaying output data, the input/output means creating an event in response to an input by an operator; a storage device for storing a plurality of software components each having a relationship exclusively to a particular data item and activated in response to a corresponding event, the event including an abstract event corresponding to an occurrence of a particular state in the data item, in addition to the event created by the input/output means; a controller activated in response to an event for specifying a selected software component to be executed subsequently to the event according to a control program; and a processor for executing the selected software component.

26 Claims, 34 Drawing Sheets

FIG. 2
PRIOR ART

| EVENT ID | ADDRESS |
|---|---|
| CLEAR SALES SCREEN | a 1 |
| DATE FOCUS-IN | a 2 |
| SHOW CANDIDATE LIST | a 3 |
| DATA ENTRY | a 4 |
| ⋮ | |

FIG. 5

| LOW-LEVEL EVENT ID | ADDRESS |
|---|---|
| CLEAR SALES SCREEN | i 1 |
|  | i 2 |
| DATA ENTRY | c |
| ... | ... |
|  | ... |
|  | ... |

FIG. 6

| HIGH-LEVEL EVENT ID | ADDRESS |
|---|---|
| ID OF SOFTWARE COMPONENT TO BE EXECUTED IN RESP TO COMPLTN OF DATA ENTRY | d 1 1 |
|  | d 1 2 |
|  | d 1 3 |
| ID OF SOFTWARE ELEMENT TO BE EXECUTED IN RESP TO COMPLTN OF AMOUNT-OF-SALE PROCESS | ... |
|  | ... |
|  | ... |

FIG. 8A

YEAR-RELATED

```
......

CHECK SECTION
......
......
PERFORM CHECKYMD

......
#COPYCOMMON CHECKYMD
```

FIG. 8B

MONTH-RELATED

```
......

CHECK SECTION
......
......
PERFORM CHECKYMD

......
#COPYCOMMON CHECKYMD
```

FIG. 8C

DAY-RELATED

```
......

CHECK SECTION
......
......
PERFORM CHECKYMD

......
#COPYCOMMON CHECKYMD
```

FIG. 13

| ID OF COMPLETED SOFTWARE ELEMENT | ADDRESS |
|---|---|
| ID OF SOFTWARE ELEMENT P | Q ADDRESS |
|  | R ADDRESS |
| ID OF SOFTWARE ELEMENT Q | S ADDRESS |
|  | T ADDRESS |
| ID OF SOFTWARE ELEMENT R | U ADDRESS |
|  | V ADDRESS |
| ID OF SOFTWARE ELEMENT U | S ADDRESS |

FIG. 14

| CLIENT CODE | CLIENT NAME | DATE | | |
|---|---|---|---|---|
| GOODS CODE | GOODS NAME | UNIT PRICE | QTY | AMOUNT |
|  |  |  |  |  |
|  |  |  |  |  |
|  |  |  |  |  |
|  |  |  |  | TOTAL |

| ID OF COMPLETED SOFTWARE ELEMENT | ADDRESS |
|---|---|
| SOFTWARE ELEMENT A | B ADDRESS |
|  | C ADDRESS |
| SOFTWARE ELEMENT C | D ADDRESS |
| SOFTWARE ELEMENT D | E ADDRESS |

F I G. 2 0
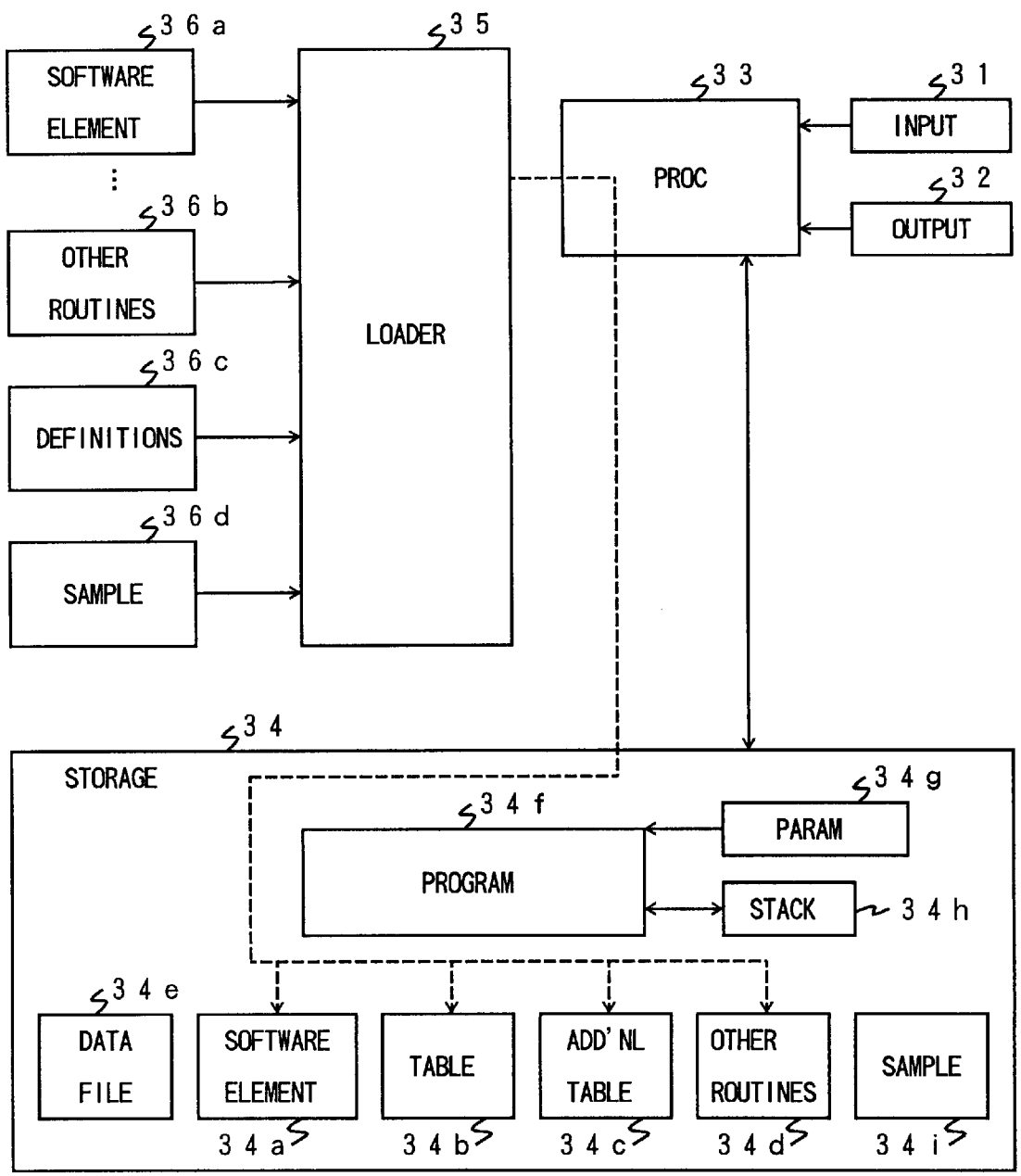

FIG. 21

| ITEM | |
|---|---|
| SAMPLE NAME | |
| ORIGINAL CHARS ...... | SUBSTITUTING CHARS ...... |

FIG. 23A

```
STATEMENT OF ITEMS IN ELEMENT A
   CLIENT NAME          DATA TYPE-CLIENT
STATEMENT OF ITEMS IN ELEMENT B
   PREF CLIENT NAME     DATA TYPE-CLIENT
STATEMENT OF ITEMS IN ELEMENT B
   FORMER CLIENT NAME   DATA TYPE-CLIENT
-------------------------------------------
DEFINITION
   CLIENT NAME          20 CHARS
```

FIG. 23B

```
STATEMENT OF ITEMS IN ELEMENT A
   CLIENT NAME          20 CHARS
STATEMENT OF ITEMS IN ELEMENT B
   PREF CLIENT NAME     20 CHARS
STATEMENT OF ITEMS IN ELEMENT B
   PREV CLIENT NAME     20 CHARS
```

FIG. 27

| CLIENT NAME | ××××. INC. | TAX. | NO COMMOD TAX |
|---|---|---|---|
| NAME OF GOODS | UNIT PRICE | QUANTITY | AMOUNT |
|  | 500 | 20 | 10,000 |
|  | 3,000 | 5 | 15,000 |
| ⋮ | ⋮ | ⋮ | ⋮ |
|  |  | TOTAL AMOUNT | 25,000 |

FIG. 28A

```
#CLIENT NAME
  CHECK SECTION.
    READ RECORD OF CLIENT FROM DB/COPY TAX CLASS FROM MASTER
```
~ 451A

FIG. 28B

```
#NAME OF GOOD
  CHECK SECTION.
    READ RECORD OF GOODS NAME FROM DB/COPY UNIT PRICE FROM
    MASTER
```
~ 451B

FIG. 28C

```
#AMOUNT OF SALE
  DERIVED SECTION.
  #(UNIT PRICE, QTY)
    UNIT PRICE X QTY IF AVAILABLE
```
~ 451C

FIG. 28D

```
#TOTAL AMOUNT OF SALE
  DERIVED SECTION.
  #(AMOUNT OF SALE)
    SUM AMOUNT OF SALE, ADD TAX IF NECESSARY
```
~ 451D

METHOD FOR EXECUTING SOFTWARE FORMED OF SOFTWARE COMPONENTS AND A SYSTEM FOR EXECUTING SUCH SOFTWARE

BACKGROUND OF THE INVENTION

The present invention generally relates to methods and systems for executing business or application software for office use such as accounting and more particularly to a method and a system for executing software formed of software components.

Corporate activities include a large amount of clerical works, accounting is an example. Most of such clerical works can be processed more or less automatically by employing business software that supports such clerical activities. However, the development of such business software generally requires a large amount of human resources. Particularly, such business software requires frequent revision in correspondence to the revision of laws, rules, etc., while such revision generally includes extensive modification or rewriting of the software program. Further, the software has to be adapted to the clerical process of each customer.

In order to facilitate such a revision or modification of software, it is proposed to construct the software from software components and concentrate the human resource to the modification or rewriting of only those pertinent software components. In other words, such software can be revised by merely replacing pertinent software components, without extensive rewriting of the program.

Conventionally, three types of such component software construction are known.

(1) SUBROUTINES

By incorporating a hierarchy of "calling routine" and "called routine," it is possible to construct the software in terms of software components. Conventional computers already have a control mechanism for executing subroutines and returning to the calling routine after completion of the subroutines. Such a control mechanism controls the flow of execution steps between the calling routines and called routines and forms an essential element of the software that is formed of software components. For example, execution of software components by way of PERFORM statement of COBOL language may be regarded as a subroutine.

(2) OBJECTS

Objects form a unit of software wherein the processing therein is concealed from outside. By decomposing software into such objects, one can execute software by sending a suitable message from an object to another object. The object that has received the message carries out a predetermined processing. In such a construction, one can construct the software to carry out a desired operation by merely providing a flow of processing between objects. Thus, one can regard the object as a software component. The mechanism for sending messages between objects and causing the objects to carry out respective, predetermined processing, is already realized in existing computer systems.

(3) EVENT-DRIVEN ROUTINES

Event-driven routines are executed in response to an occurrence of a particular event. Such event-driven routines may be regarded as a software component. The mechanism for executing an event-driven routine in response to an occurrence of a corresponding event is already realized in existing computer systems. There are various known event-driven systems, some of which are described below.

i) EXAMPLE OF EVENT-DRIVEN ROUTINES (1)

FIG. 1 shows the construction of a system for executing software formed of "software components," wherein the illustrated system carries out data input and data output via a display acting as an output device and a keyboard that acts as an input device.

Referring to FIG. 1, the system includes an input device 101 such as a keyboard or monitor, an output device 102 such as a monitor that displays visual information on a monitor screen 102a, and function keys 102a. The system further includes a selection device 103 for specifying a routine to be executed in response to an event, and an event table 103a that stores event identifiers for identifying the type of the events and the address of the event-driven routines to be activated in response to the detected events, wherein the selection device 103 specifies an event-driven routine to be executed, when an event has occurred, by referring to the aforementioned event table 103a.

The system of FIG. 1 further includes a processor 104 for executing the specified event-driven routine, and a storage device 105 that stores therein various event-driven routines $105a_1$, $105a_2$, . . . as well as other routines 105b.

FIG. 2 shows an example of the event table 103a. Referring to FIG. 2, it will be noted that the table 103a includes event identifiers for identifying the events and the address of the event driven routines stored in the storage device 105.

Referring to FIG. 1 again, the input device 101 and/or output device 102 notifies the occurrence of an event to the selection device 103 in response to a focusing-in operation, wherein the focusing-in operation indicates a movement of the cursor to a particular data item A shown in the monitor screen 102a.

Upon notification of the event, the selection device 103 refers to the event table 103a and acquires the address of the pertinent event driven routine such as the routine $105a_1$. Further, the selection device 103 instructs the processor 104 to execute the event-driven routine that corresponds to the given event. The processor 104 thereby reads out the selected event-driven routine from the storage device 105 and carries out the execution thereof.

More specifically, when a focusing-in event for focusing a particular data item A on the monitor screen 102a occurs, the selection device 103 refers to the event table 103a and acquires the address of the event-driven routine that corresponds to the event. Further, the device 103 instructs the processor 104 to execute the processing, and as a result, a prompt message is displayed on the screen 102a urging the operator to input data for the item A.

Such a processing system of software components generally includes various event-driven routines examples of which are described below.

(a) FOCUSING-IN OF DATA ITEM

In the present example, an event-driven routine is carried out in response to the event of the cursor moving to a particular data item. This event-driven routine typically includes display of prompt message for urging the user to input a particular type of input data to the selected data item.

(b) LISTING OF INPUT CANDIDATES

In response to the pressing-down of a function key corresponding to the "SHOW INPUT LIST," a corresponding event-driven routine is activated.

In this event-driven routine, the data item that is pointed out by the cursor on the monitor screen is identified and the input candidates for the selected data item are listed. By selecting one of such candidates instead of typing each letter from the keyboard, the input operation of the user for data entry is significantly facilitated.

(c) COMPLETION OF DATA ENTRY

This event-driven routine is carried out in response to the event of completion of data entry and typically includes processes such as: data check including validity of data format and compatibility with respect to the content of other data items; calculate and set a value in those data items of which calculation becomes possible in response to the completion of the data entry; and display the calculated value of the data items on the monitor screen.

In the foregoing examples (a)–(c), the event-driven routines (a) and (c) are related to the a particular data item, while the event-driven routine (b) is related only to the event of pressing-down of a particular function key. In other words, the event-driven routine (b) is not related to a particular data item. Further, it should be noted that the event-driven routine (a) executes a processing that has a close or strong relationship with respect to a single, particular data item, while the event-driven routines (b) and (c) may be related to a plurality of data items. In the event that the event-driven routine (c) contains a very simple processing, there may be a case wherein the event-driven routine (c) is related exclusively to a particular data item.

As an improvement of the foregoing event-driven routine, it is also practiced to modify the event-driven routine (b) so as to set a relationship to a particular data item as follows.

(b') SHOW LIST OF DATA ENTRY FOR A PARTICULAR DATA ITEM

This event-driven routine is activated in response to the pressing-down of a particular function key in the state that the cursor on the screen points a particular data item, and shows a list of candidates of date entry for the pointed data item. In this case, the event-driven routine has a strong relationship to a particular data item.

Summarizing the above, one can regard the event-driven routines (a) and (b') as well as the event-driven routine (c) that executes a simple process related to a particular data item, can be regarded as a software component corresponding to a data item.

(ii) EXAMPLE OF EVENT-DRIVEN ROUTINES (2)

Japanese Laid-open Patent Publication 4-238534 describes a technique for carrying out data entry for each of the data items on a screen, wherein the screen input/output control program is divided into a plurality of software components corresponding to the data items. In the foregoing prior art, the screen input/output control program is divided into a screen control component for determining the sequence of transition of the screen, data item control component for determining the sequence of processing of the data items displayed on the screen, and the data item processing components provided in correspondence to each of the data items for carrying out editing. Thereby, the productivity of the software development as well as easiness of modification of the software are improved.

Further, it is known to construct software from the software components corresponding to respective data items and data item group components corresponding to a group of data items.

In the foregoing various conventional processes, one encounters following problems.

(1) DIFFICULTY FOR REUSING COMPONENTS

While it may be possible to construct application software primarily from reusable components in a particular field, there are fields such as business software tailored for specific demand of clients or accounting software that heavily depends upon national as well as regional laws and regulations wherein the reuse of software component is difficult. Examples are listed below.

<1> SOFTWARE FOR CARRYING OUT DATA ENTRY

Such software adds, modifies or deletes data to a data file in a storage device in response to the data that is entered via input devices. The structure of the data file may be different depending upon the customer.

<2> SOFTWARE FOR TABULATION

Such software stores the data obtained by a tabulation process into a storage device in the form of data file. The tabulation process as well as the structure of data file may be different depending upon the customer.

<3> SOFTWARE FOR OUTPUTTING FORMS

Such software outputs data held in a data file in the form of a form. The form may be different depending upon the customer.

In the conventional example described with reference to (i), one may be able to reuse the event-driven routines (a) and (b') to some extent, while about the event-driven routine (c), reuse thereof would be difficult, unless the event-driven routine includes only a very simple processing. In the actual business applications, such a case is rare. Further, there are cases wherein the event-driven routine is related to a plurality of events.

In the conventional example described with reference to (ii), simple software components related to a single data item may be reusable. However, other software components are related to a plurality of data items and are difficult to be reused.

(2) WEAK RELATIONSHIP BETWEEN FUNCTION AND SOFTWARE COMPONENT

In a specific field, the application software may be formed of software components that are closely related to their functions. In such a case, the modification of function of the software may be easily attended to by replacing the components.

In the business applications described before, however, it is difficult to construct the software exclusively from components that are closely related to the functions, and mere replacement of component software does not lead to the desired result.

In the foregoing conventional example (i), for example, the existence of the event-driven routine (c) that is related to a plurality of data items makes it difficult to achieve the desired modification of the software by simply replacing the software component. In such a case, it is necessary to replace or modify other, numerous related software components as well.

The same holds true for the conventional example (ii) wherein a large number of software components have to be replaced or modified simultaneously in order to achieve a desired modification of the software.

SUMMARY OF THE INVENTION

Accordingly, it is a general object of the present invention to provide a novel and useful method and system for executing software formed of software components wherein the foregoing problems are eliminated.

Another and more specific object of the present invention is to provide processing method and system for executing software formed of software components, wherein the software components are reusable. According to the present invention, the productivity for developing or modifying application software increases significantly, particularly in the field of business applications. Particularly, the modification of the software according to the demand of user or customer can be easily attended to by merely replacing or rewriting small number of software components.

Another object of the present invention is to provide processing method and system for executing a software formed of software components, wherein the software can be adapted to a particular operational mode such as data updating mode, data input/output mode, type of human-computer interface, use or no-use of server-client configuration, etc., by simply setting operational parameters, without extensive modification of the software components or a control system that controls execution of the software components.

Another object of the present invention is to provide a method and system for executing software formed of software components, wherein modification of the software can be achieved easily.

Another object of the present invention is to provide a processing system for executing software that carries out a processing of a plurality of data items that represent the smallest, yet logically meaningful data unit, comprising:

storage means for storing a plurality of software components, each of said software components having a relationship exclusively to a particular data item that is processed by said software and activated in response to a corresponding event, said software components thereby forming a part of said software;

control means, activated in response to an occurrence of an event in said processing system, for specifying a selected software component to be executed subsequently to said event according to a control program forming another part of said software; and processing means for executing said selected software component;

wherein said event includes an occurrence of a particular state in said data items.

According to the present invention, it is possible to use the control program commonly for various versions of the application software while only pertinent software components are modified or rewritten as needed. For example, a software program written for specific customer can be readily modified according to the needs of another customer by merely rewriting pertinent software component(s). In the law- or regulation-related software such as accounting software, only the pertinent software components are modified or rewritten when a law or regulation has been changed, while using the rest of the software commonly before and after the revision of laws. It should be noted that data items to be inputted, processed and outputted may vary variously depending upon the customer while the object of the application software is more or less the same, as long as the application software is used for a specific purpose such as accounting. Thereby, the time or resource needed for developing or modifying application programs tailored for a specific customer to other customers is significantly facilitated.

Other objects and further features of the present invention will become apparent from the following detailed description when read in conjunction with attached drawings.

BRIEF DESCRIPTION OF THE DRAWINGS

FIG. 2 is a diagram showing an event table used in the system of FIG. 1;

FIG. 5 is a diagram showing an event table used in the system of FIG. 4;

FIG. 6 is a diagram showing another event table used in the system of FIG. 4;

FIGS. 8A–8C are diagrams showing the example of the relation-check components in the system of FIG. 4;

FIG. 13 is a diagram showing an example of still other event table used in the system of FIG. 4;

FIG. 14 is a diagram showing an example of the data shown on a screen in the system of FIG. 4;

FIG. 20 is a diagram showing the construction of the event-driven processing system according to a fifth embodiment of the present invention;

FIG. 21 is a diagram showing an example of the software component used in the system of FIG. 20;

FIGS. 23A and 23B are diagrams showing the examples of statement of the data items used in the sixth embodiment of the present invention;

FIG. 27 is a diagram showing an example of the screen in the system of FIG. 24;

FIGS. 28A–28D are diagrams showing the example of various event-driven routines in the system of FIG. 24.

DETAILED DESCRIPTION OF PREFERRED EMBODIMENTS

Figure 3:
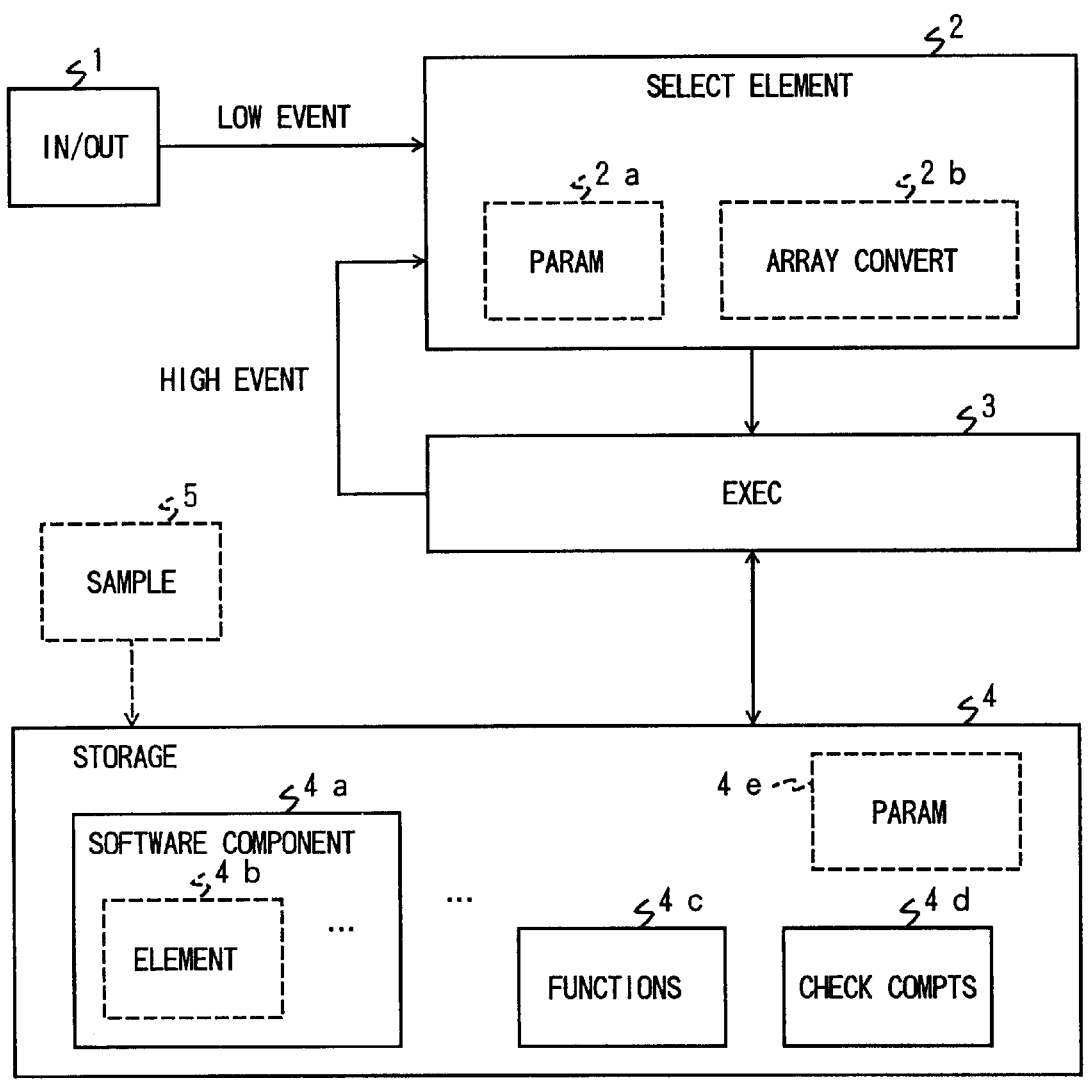
FIG. 3 is a diagram showing the principle of the present invention.

First, the principle of the present invention will be described with reference to FIG. 3 showing the fundamental construction of the data processing system used in the present invention, wherein the data processing system executes application software that processes various data items.

Referring to FIG. 3, the data processing system includes an input/output device 1 for inputting and outputting data, wherein the input output/device 1 detects and notifies the occurrence of an event. The event that the input/output device 1 detects is a physical event or low-level event related to the actuation of keyboard or pointing of mouse and is included in but distinguished from a logic event or high-level event to be described below. The concept of low-level event used herein corresponds to the commonly used concept of event.

Figure 1:
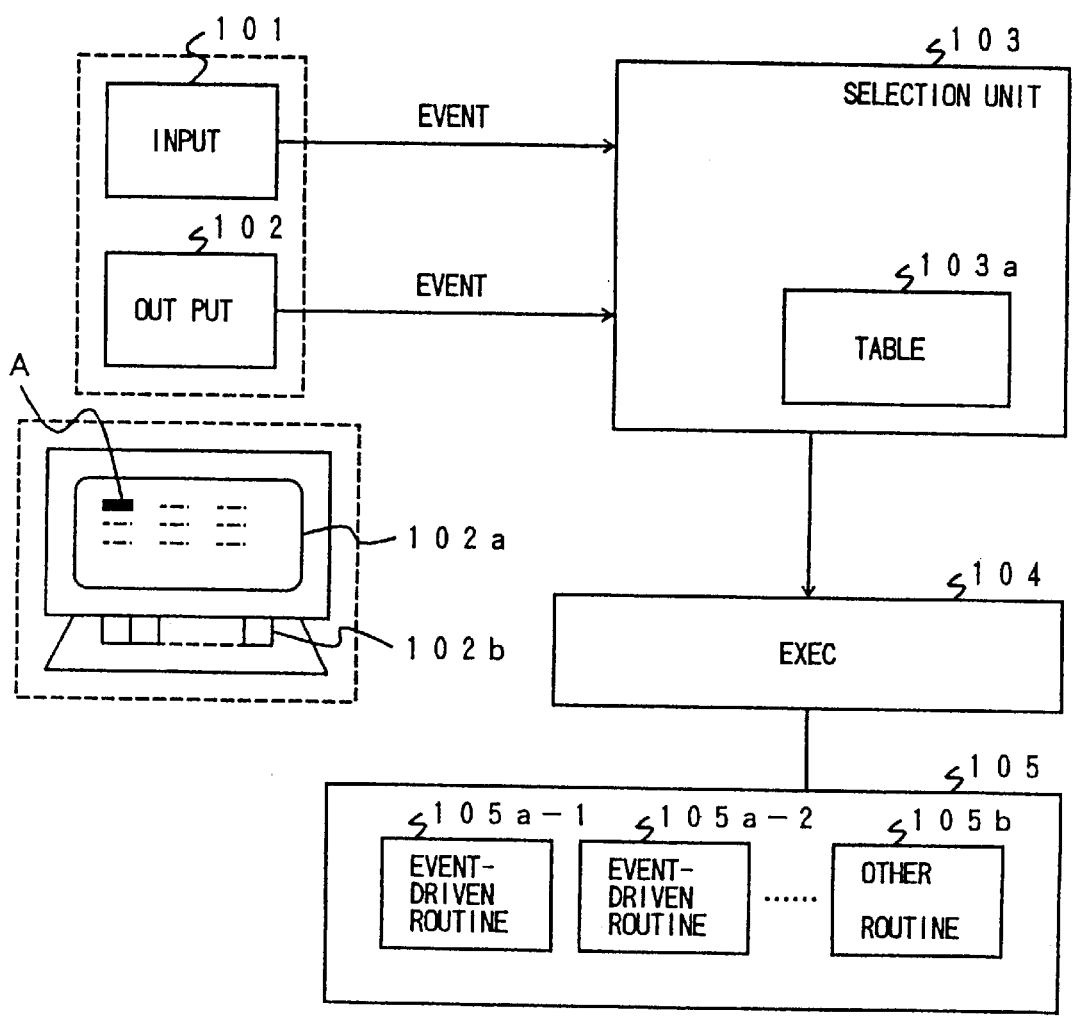
FIG. 1 is a diagram showing the construction of a conventional event-driven processing system.

The system of FIG. 3 further includes a memory device 4 that stores therein a number of item-related software elements or simply elements 4b that form a fundamental part of the application software to be executed by the system of FIG. 1, wherein each of the software elements 4b has a strong relationship to a corresponding data item to be processed by the application software. In FIG. 3, those software elements 4b having a strong relationship to a specific, common data item are grouped to form a software component 4a corresponding to a specific, common item, wherein the software component 4a corresponds to the aforementioned software component. The memory device 4 may store one or more software components 4a therein. In addition to the software components 4a, the memory device 4 stores functional components 4c that are called by the software elements 4b, check components 4d for checking the relationship or validity between the data items, operational parameters 4e that specifies the manner or mode the data updating process is carried out, and a sample file 5 of the software component.

In order to select the software component, the processing system of FIG. 3 uses a selection unit 2 that is notified by the input/output device 1 of the occurrence of a low-level event, wherein the selection unit 2 monitors also for the occurrence of a high-level event such as a transition of value or state of the data item and selects the software component 4a or element 4b to be executed next to the detected event. Thereby, the selection unit 2 is controlled by a control program that forms another essential part of the application software. The selection unit 2 may include additional units such as an operational parameter setup unit 2a that specifies the input/output interface control between the input/output device 1 and the selection unit 2, and a conversion unit 2b for converting array data having indices to data free from indices.

The software component 4a or element 4b specified by the selection unit 2 is read out from the memory device 4 and is executed by an execution unit 3, wherein the execution unit 3 reports the completion of execution to the selection unit 2, and the selection unit 2 detects such a notification as a high-level event described previously.

Thus, in the construction of FIG. 3, the execution of the application software proceeds automatically and in response to the low-level as well as high-level events notified by the execution unit 3, in accordance with the control program that forms a part of the application software. As the demand that is specific to the customer or user is primarily related to the data items and hence described in the software components, there is little need for modifying the control program that forms the skeleton of the application software. Thus, one can easily adapt the application software to various demands of the customers by modifying or rewriting only the pertinent software components while using the rest of the software unchanged. The data item is sometimes called as item or "field."

In order to achieve the foregoing automatic control of the selection unit 2, it should be noted that activation of the unit 2 in response to the high-level event is essential. Such a control of the selection unit 2 may be called "high-level event-driven process" or "expanded event-driven process" and the software components 4a or elements 4b as "expanded event-driven runtiness." By employing such an expanded event-driven processes, one can arrange most of the application software in terms of the expanded event-driven routines such as the components 4a or 4b and the control program that controls the execution of the expanded event-driven process.

Most of the foregoing expanded event-driven routines have a strong relationship to one or more data items. Thus, by defining a number of item-related software elements 4b in the expanded event-driven routines such that each software elements corresponds to a particular related data item, the remaining, skeleton part of the application software becomes minimum. As the software element 4b thus defined has a particular relationship to a corresponding data item, such software elements 4b can be used extensively for various versions of application software for business use.

It should be noted that the software component 4a shown in FIG. 3 forms a hierarchy of assemblage of the software elements 4b that shares the data item commonly. Thus, one can handle the software component 4a as a quantity corresponding to a data item in one-to-one relationship, and the productivity of the software development increases further. By activating a software component 4a in response to a high-level event, all of the expanded event-driven routines that relate to the common data item are executed.

The use of the software component 4a is also advantageous in view point of the fact that the execution of the next data item is commenced in response to the completion of the current data item such as the transition of the state of the current data item. In the system of FIG. 3, such a transition of the current data item is detected as a high-level event, and the selection unit 2 selects the next data item to be processed in response thereto. In other words, such a selection of the data item carried out by the selection unit 2 includes a branching step that is carried out in response to the high-level event indicative of the completion of processing for a current data item. Such a supervising of the processing is carried out based upon the control program that forms the skeleton part of the application software as mentioned previously.

Figure 4:
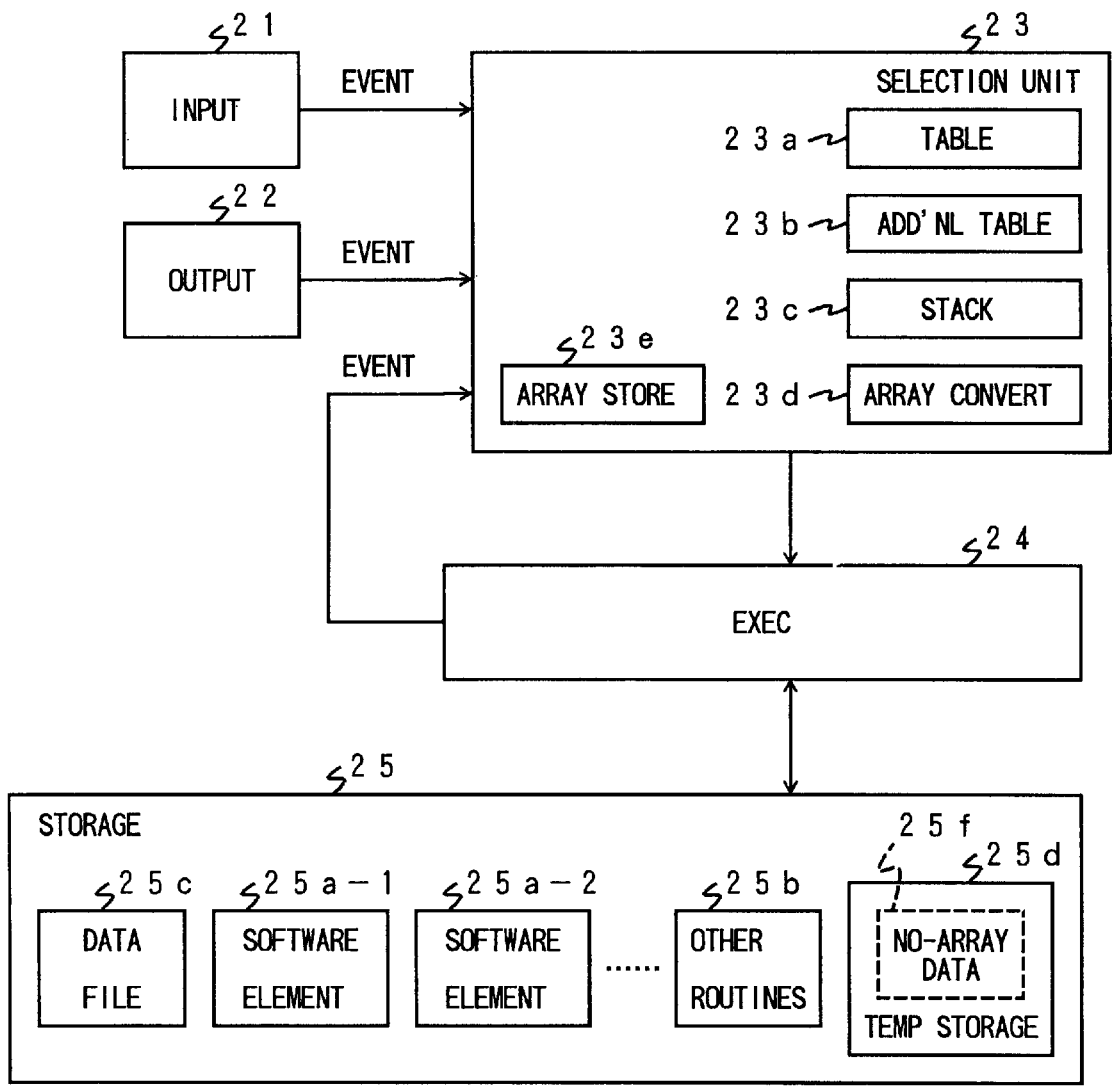
FIG. 4 is a diagram showing the construction of the event-driven processing system according to a first embodiment of the present invention.

FIG. 4 shows a first embodiment of the present invention and represents a more specific illustration of the processing system of FIG. 3. The system of FIG. 4 includes an input device 21 such as a keyboard, an output device 22 such as a display device, and a selection unit 23 that is notified from the input device 21 or output device 22 of the occurrence of a low-level event, wherein the selection unit 23 includes an event table 23a shown in FIG. 5 that stores event identifiers for identifying the low-level events and the address of related software elements $25a_1, 25a_2, \ldots$ in a storage device as will be described later. It should be noted that the related software elements $25a_1, 25a_2, \ldots$ correspond to the software elements 4b of FIG. 3. The selection unit 23 further includes an additional event table 23b shown in FIG. 6, wherein the additional event table 23b includes identifiers for identifying high-level events indicative of the completion of execution of the software elements $25a_1, 25a_2, \ldots$ and the address of the software elements $25a_1, 25a_2, \ldots$ that are to be executed upon occurrence of the high-level event specified by the identifier. Thus, the selection unit 23 refers to the event tables 23a and 23a for executing a software element such as element $25a_1$ upon the occurrence of the low-level event as well as the high-level event.

The address data of the software elements thus acquired by referring to the event tables 23a and 23b are stored in a memory stack 23c according to the order of processing.

Further, the selection unit 23 includes a conversion unit 23d for converting array data having indices into data without indices and a memory unit 23e that holds the array data. The memory unit 23e thereby stored the array data supplied from the input device 21 with repetition corresponding to the array, and transfers the same to the conversion unit 23d for conversion to the data having no indices. The data thus converted is then transferred to the storage device 25 and stored in a particular storage area 251 that is provided in a temporary storage device 25d that forms a part of the storage device 25.

The storage device 25 includes the foregoing software elements $25a_1$, $25a_2$, ..., wherein these software elements execute a processing pertinent thereto based upon the data held in the storage are 251. When the execution is completed, the software element transfers the result of the execution to the selection unit 23. The data thus transferred without indices are then converted back into the array data by the foregoing conversion unit 23d and stored in the memory unit 23e ready for transfer to the output device 22. By constructing the processing system including the selection unit 23 and the storage device 25 as set forth above, the software elements $25a_1$, $25a_2$, ... process only data having no indices. Thus, there is no need to provide additional processing units for processing array data.

The system of FIG. 4 further includes an execution unit 24 corresponding to the unit 3 of FIG. 3 wherein the execution unit 24 carries out the execution of the software element specified by the selection unit 23. Upon completion of the execution, the execution unit 24 issues a notification for notifying the completion of execution to the unit 23 as an event.

It should be noted that the storage device 25 includes non-volatile storage devices such as magnetic disks in addition to the semiconductor main memory of the processing system and stores therein, in addition to the software elements $25a_1$, $25a_2$, ..., other routines 25b as well as a data file 25c that includes various data that are referred to during the processing. In addition, the temporary storage device 25d includes the storage unit 251 described already for storing data converted by the conversion unit 23d.

As described previously, each of the software elements $25a_1$, $25a_2$, ... is a routine having a strong relationship to a data item processed by the application software and is executed in response to a high-level event such as the transition of state of a particular data item or the occurrence of a particular relationship between a set of data items. Such a high-level event triggers the execution of all the related software elements.

The storage device 25 further includes the routines 25b mentioned before, wherein the routines 25b do not have a relationship to a particular data item. For example, the routine 25b may be a screen processing routine for carrying out the processing for the entire screen, a form processing routine for carrying out the processing of form, or a routine for carrying out the processing for the entire record of a database.

The following list shows an example of the high-level events for the software elements $25a_1$, $25a_2$, ....

| definition | identifier |
|---|---|
| 1) EVENTS RELATED TO SCREENS | |
| open a table | OPEN-TABLE |
| initialize | INIT |
| show prompt | PROMPT |
| show help | HELP |
| show list of candidates | SLIST |
| show information | INFORMATION |
| write to master file | MASTER |
| input check | CHECK |
| (data input complete, focus out) | |
| derived event | DERIVED |
| timer interruption | TIMER |
| close a table | CLOSE-TABLE |
| 2) EVENTS RELATED TO FORMS | |
| open a table | OPEN-TABLE |
| calculate a description | CALC-DE |
| report header | REPORT-HEAD |
| page header | PAGE-HEAD |
| control-break header | CB-HEAD |
| print a description | PRINT-DE |
| control-break footer | CB-FOOT |
| page footer | PAGE-FOOT |
| report footer | REPORT-FOOT |
| close a table | CLOSE-TABLE |
| 3) EVENTS RELATED TO TABLE ITEMS | |
| database initialize | DBINIT |
| database set | SBSET |
| database delete | DBDEL |

Figure 7:
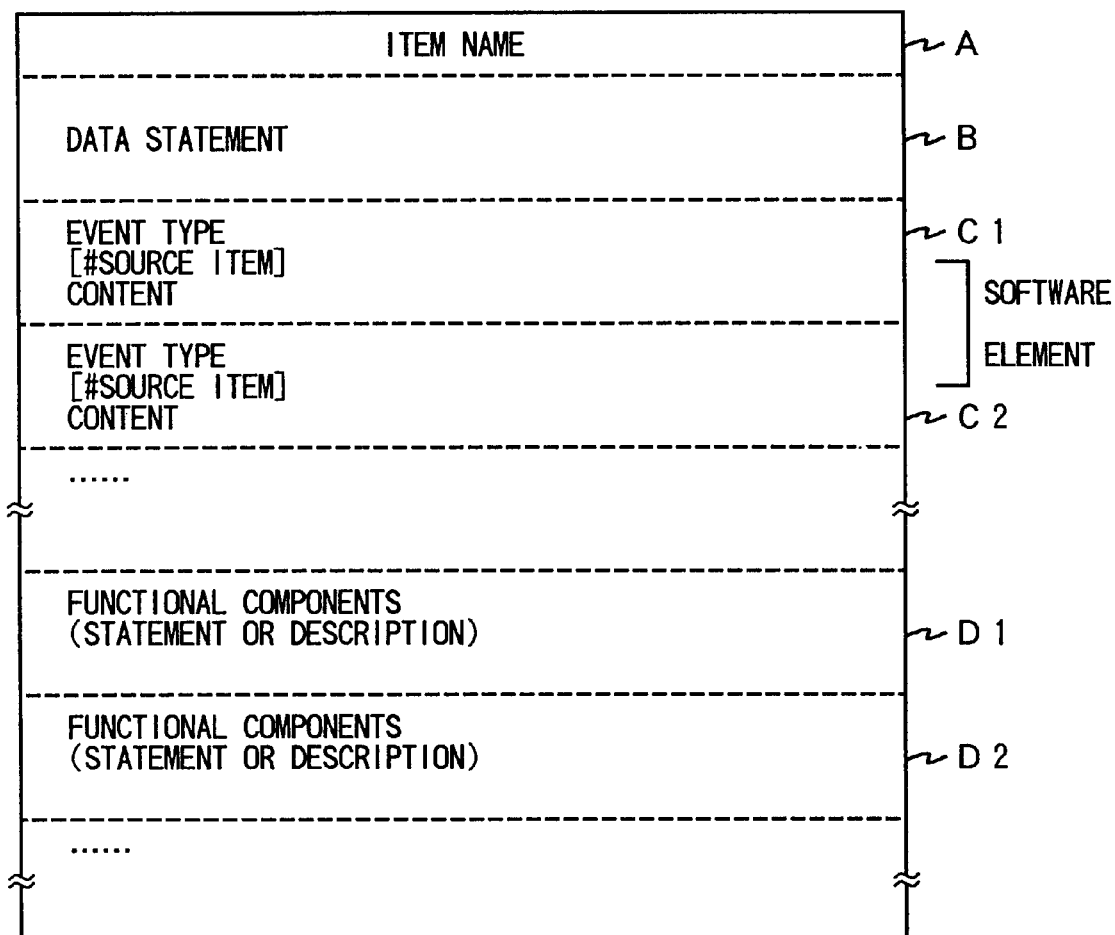
FIG. 7 is a diagram showing an example of the software component used in the system of FIG. 4.

FIG. 7 shows the general constitution of a software component corresponding to the component 4a of FIG. 3 in which a number of software elements $25a_1$, $25a_2$, ... are grouped together.

Referring to FIG. 7, the software component includes a field A for the name or designation of the pertinent data item and a field B for the data statement, wherein the field B defines the data item that is pertinent to the software component in the field A. Further, there are provided one or more fields C1, C2, ... for the software elements $25a_1$, $25a_2$, ..., wherein each of the fields C1 and C2 includes an identification of the event type that triggers the execution of the software element and the content of the processing executed by the software element. The item name in the field A and the event type in the field C1 or C2 are used as the identifier of the software element.

It should be noted that the field C1 or C2 of FIG. 7 may also include a source item that designates the software element of which execution triggers the execution of the software element under consideration. Depending upon the software component, the column for the source item may be blank.

The software element that includes a source item is executed in the event that the software element of the source item has changed the state, in response to the completion of the software element for the designated source item. It should be noted that the software element may include a plurality of source items.

As already mentioned, the event table 23a and the additional event table 23a stores therein the address of the foregoing software elements, wherein the software elements are executed upon notification of the high-level event.

In FIG. 7, the fields D1 and D2 accommodates therein functional components, which is a frequently used, predetermined procedure such as calculation of date or calculation of interest, wherein such predetermined procedures are called by the software element as necessary.

FIGS. 8(A)–8(C) show examples of such a software component including the functional components, wherein the illustrated examples show checking components for checking the validity of the year (FIG. 8(A)), month (FIG. 8(B)) and day (FIG. 8(C)), respectively.

When checking the validity of year, month and day obtained by respective, different software components, it is necessary to conduct a checking process across and over all of the three different items as indicated in FIGS. 8(A), 8(B) and 8(C), wherein FIG. 8(A) shows the software component related to the calculation of year, FIG. 8(B) shows the software component for the calculation of month, and FIG. 8(C) shows the software component for the calculation of day. It should be noted that all these software components include a software element and a functional component such as CHECK SECTION, PERFORM CHECKYMD, etc, wherein the CHECK SECTION is a software element for checking the pertinent input data upon occurrence of the focusing-out event. It should be noted that the focusing-out event herein means the operation to move the cursor away from a currently selected data item. Further, the PERFORM CHECKYMD indicates a functional component for checking the relationship between year, month and date and corresponds to the relation-checking component 4d of FIG. 3. By providing the software elements and functional components such as the CHECK SECTION and PERFORM CHECKYMD as separate subroutines and calling such a subroutine as necessary, it is possible to eliminate the occurrence of any discrepancy in the checking process between different software components shown in FIGS. 8(A)–8(C). Further, the last line of FIGS. 8(A)–8(C) designates the functional component to be incorporated into the respective software components.

Figure 9:
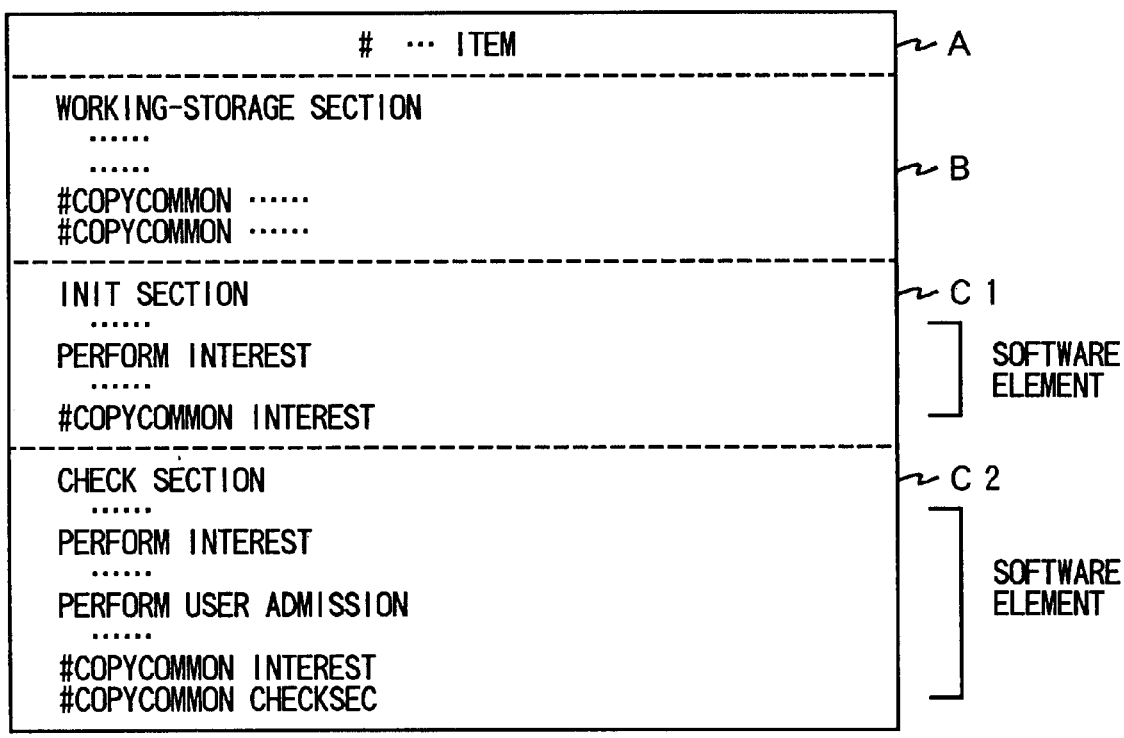
FIG. 9 is a diagram showing an example of the software component that includes various functional components and relation-check components.

FIG. 9 shows another example of the software component that includes the functional components 4c of FIG. 3, wherein the illustrated software component includes the field A for the name of the data item, the field B for the description of the data item in the field A, and the fields C1 and C2 for the software components.

Referring to FIG. 9, the software components includes the designation of the event type such as INIT SECTION and CHECK SECTION, wherein the event type INIT SECTION indicates that the software element in the field C1 is the one that is carried out at the beginning of operation of the system for setting initial parameters. The event type CHECK SECTION in the field C2, on the other hand, designates that the software element in the field C2 is the one that is executed in response to a focusing out event for checking the validity of the pertinent input data as explained above.

Further, software components in the illustrated example call the functional blocks PERFORM INTEREST for calculating the interest and PERFORM USER ADMISSION for checking the admission status of the user.

Figure 10:
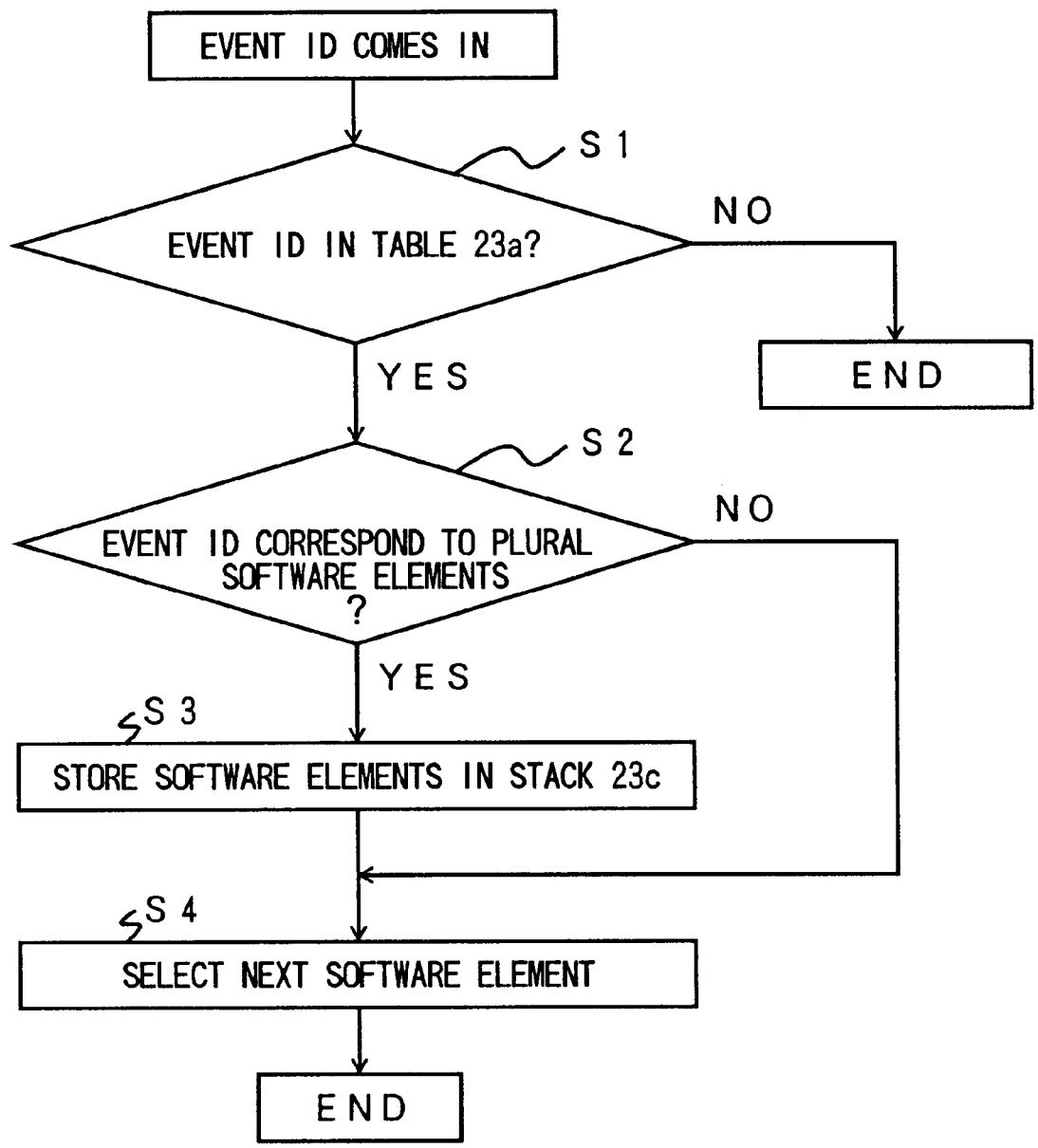
FIGS. 10–12 are flowcharts showing the operation of the system of FIG. 4 in response to various events.
Figure 12:
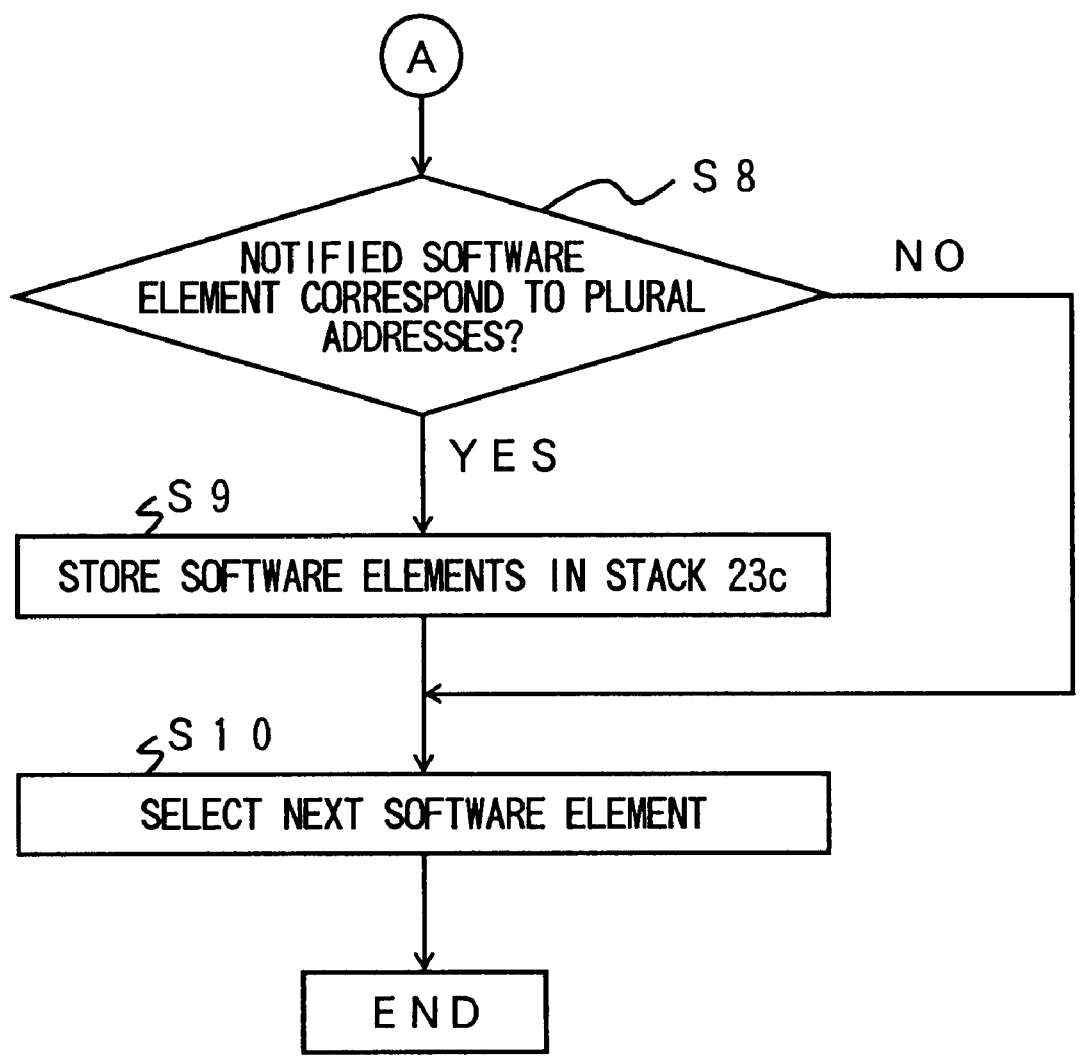

FIGS. 10 and 12 are flowcharts showing the process carried out by the selection unit 23 of FIG. 4, wherein FIG. 10 shows the operation for the case in which occurrence of an event is reported. FIG. 12, on the other hand, shows the operation for the case in which the execution of a software element is completed.

Referring to the drawings, the selection unit 23 checks, in response to the notification of an event identifier that reports the occurrence of a low-level event in the input device 21 or output device 22, for the event table 23a in a step S1 of FIG. 10, whether or not the notified event identifier is included in the event table 23a. When such an event identifier is not included in the table 23a, the process for the corresponding event is terminated immediately. In other words, the event is ignored and the system waits for the next event. On the other hand, when the event identifier is included in the table 23a, an examination is made in a step S2 whether or not the notified event identifier corresponds to a plurality of software elements. If the result of examination is YES, a step S3 is carried out wherein the software element(s) excluding the first software element is (are) stored in the stack 23c one by one according to the increasing order of address of the software elements, and a step S4 is carried out subsequently. When the result of the step S2 is NO, on the other hand, the step S4 is carried out immediately after the step S2 by bypassing the step S3. In the step S4, the first software element is selected and an instruction is issued to the execution unit 24 for the execution of the selected software element.

In response to the instruction, the execution unit 24 reads out the specified software element from the corresponding address of the storage device 25 and executes the software element thus read out. Upon completion of the execution, the execution unit 24 notifies to the selection unit 23 of the completion of execution.

Figure 11:
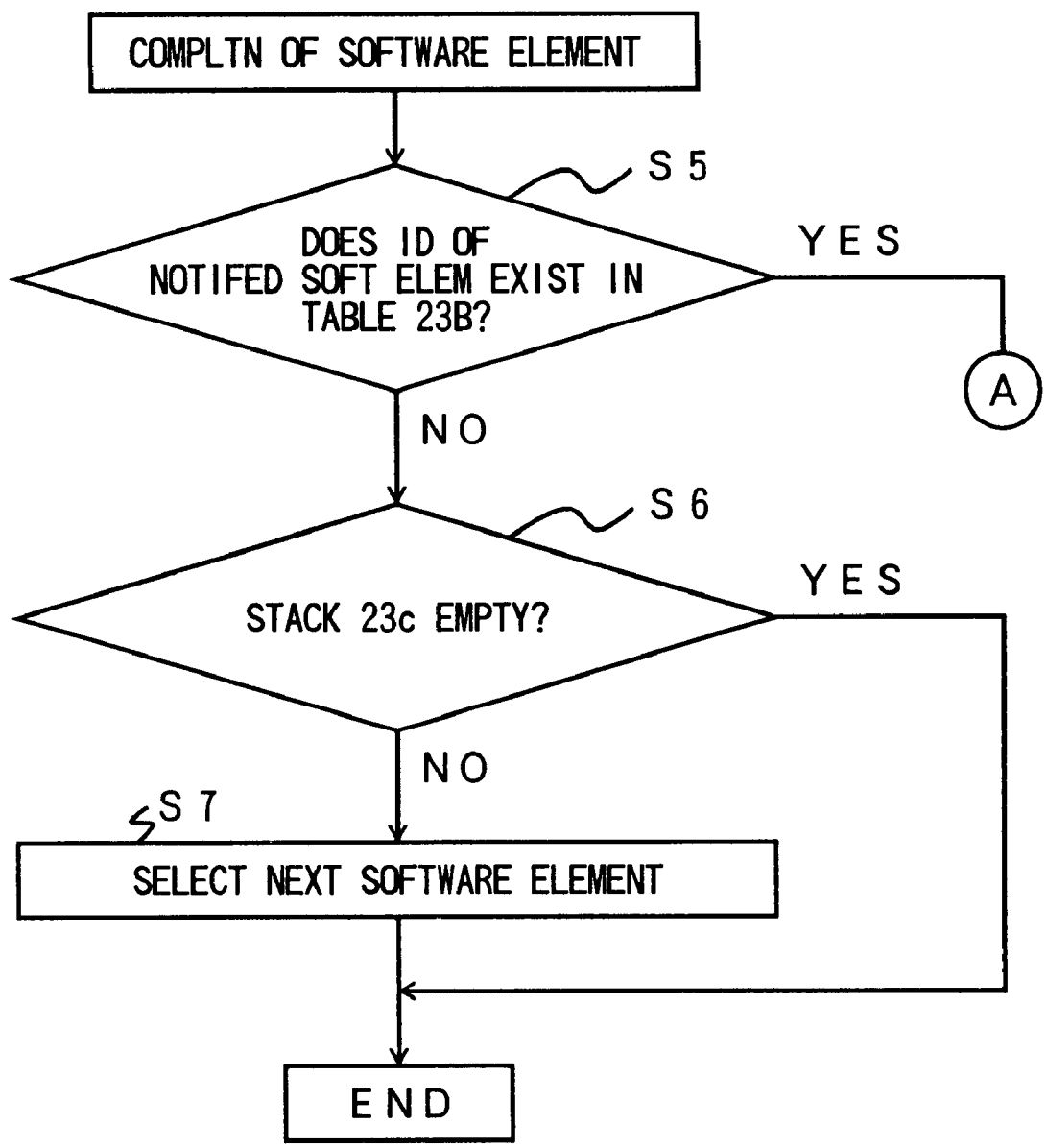

In response to the notification of the completion of execution from the execution unit 24, the selection unit 23 examines, in a step S5 of FIG. 11, whether or not the identifier of the software element of which execution has just been completed is included in the additional event table 23a. If the result of the examination is YES, a step S8 of FIG. 12 is carried out as will be described later. If the result is NO, a step S6 of FIG. 11 is carried out for checking if the stack 23c is empty. When the stack 23c is empty, the process is terminated immediately. On the other hand, when the stack 23c is not empty, a step S7 is carried out wherein the address of the next software element is read out, and the selection unit 23 issues an instruction to the execution unit 24 for the execution of the selected software component.

When it is judged in the step S5 of FIG. 11 that the identifier of the software element of which execution has just been completed is included in the additional table 23b, the step S8 of FIG. 12 is carried out. In the step S8, an examination is made whether the identifier of the notified software element that has been completed corresponds to a plurality of software element addresses. If the result of the examination is NO, a step S10 is carried out as will be described later, while if the result is YES, a step S9 is carried out. In the step S9, the addresses of the software elements that correspond to the software element of which execution has been completed, are set in the stack 23c one by one, excluding a first software element. Next, in the step S10, the selection unit 23 specifies the address of the first software element that corresponds to the identifier of the software element of which execution has been completed, and the execution unit 24 carries out the execution of the specified software element, by reading out the software element from the corresponding address of the storage device 25.

In the foregoing embodiment, the order of execution of the software elements is determined according to the so-called depth-first principle. On the other hand, in view point of actual use of the present invention, it may be advantageous to set the order of processing according to the width-first principle described below.

Assuming that there exist seven software elements P–V and an additional event table shown in FIG. 13, the order of execution according to the depth-first principle is given by the sequence (1), while the order of execution according to the width-first principle is given by the sequence (2). (1)

completion of software element P: execute software element Q→execute software element S→execute software element T→execute software element R execute software element U→(execute software element S)→execute software element V. (2) completion of the software element P: execute software element Q→execute software element R execute software element T→execute software element U→execute software element V→execute software element S.

Figures 15, 16:
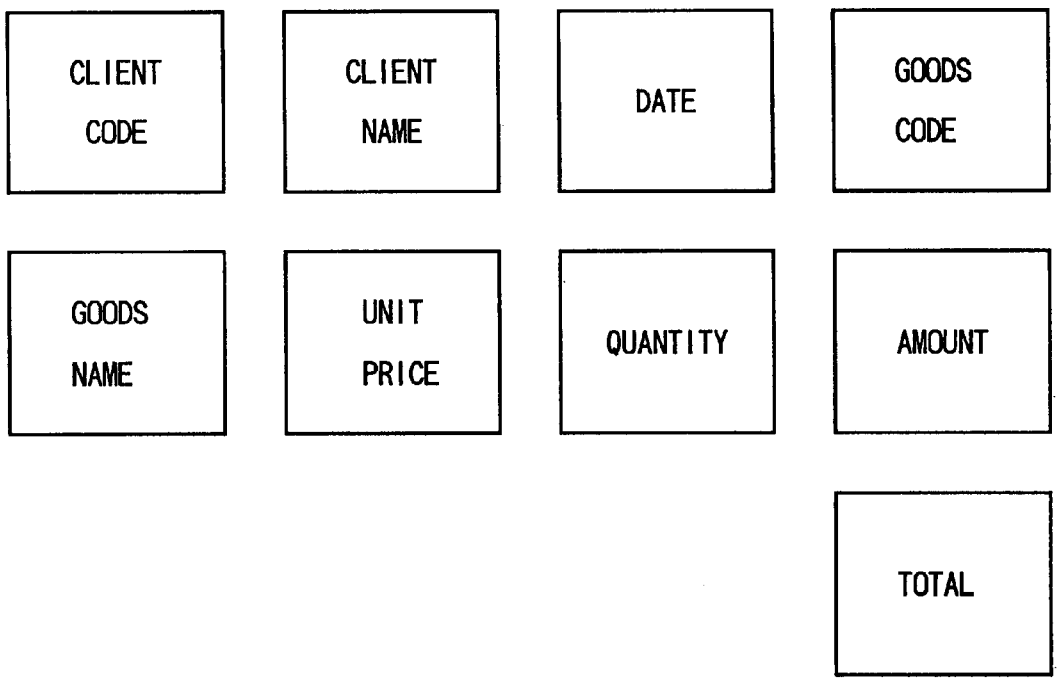
FIG. 15 is a diagram showing the example of various software components related to the screen of FIG. 14.
FIG. 16 is a diagram showing an example of still other event table used in the system of FIG. 4 in relation to the screen of FIG. 14.

FIGS. 14–16 show the case wherein the system of the first embodiment is applied for the calculation of amount of sale of goods from the unit price and quantity.

Referring to FIG. 14 showing an example of the screen on the display device 22, it will be noted that display device 22 displays information such as "client code," "goods code," "goods name," "unit price," "quantity," "amount of sale," and the like. The screen of FIG. 12 is generally divided into three areas, the first area for the header description for indicating the "client code," "client name" and the "date," the second area for the body description for indicating the "goods code," "goods name," "unit price," "quantity" and the "amount of sale," and a third area for the tail description for indicating the "total amount of sale."

In FIG. 14, it will be noted that the body description area includes a number of description lines. Thus, the data items in such a body description area generally form an array that have indices such as "goods code [line number]," "goods name [line number]," . . . .

When representing the data items in the form of array data, on the other hand, there arises a problem in that one has to provide a separate software element that processes such array data exclusively. It should be noted that the copy or move of data from the header area to the body description area includes a correction process of adding indices to the data. Similarly, the copy or move of data from the body description area to the header area includes a correction process for removing indices.

In order to eliminate such a correction process of data, the selection unit 23 of FIG. 4 uses the conversion unit 23d for converting the array data to the data having no indices as described previously, wherein the data thus converted is stored in the storage are 251 provided in the temporary storage device 25d that forms a part of the storage device 25. Each of the software elements $25a_1$, $25a_2$, . . . includes a description about the processing of the current line and carries out an execution of the data items held in the storage area 251 without indices.

FIG. 15 shows an example of the software components used in the present embodiment, wherein it will be noted that the software components include software components such as a client code component, client name component, date component, goods code component, goods name component, unit price component, quantity component, amount component, and a total amount component.

Next, the operation of the system of FIG. 4 will be described for the case wherein the software elements A–E defined below are included in the operation and there exists an additional event table having a construction shown in FIG. 16.

A. A software element corresponding to the event of completion of data input and is related to the code of the goods.
B. A software element triggered in response to the completion of execution of the software element A and is related to the name of the goods.
C. A software element triggered in response to the completion of execution of the software element A and is related to the unit price.
D. A software element triggered in response to the completion of execution of the software element C and is related to the amount of sale.
E. A software element triggered in response to the completion of execution of the software element D and is related to the total amount of sale.

Referring to the screen of FIG. 14, a notification of the event is made from the input device 21 to the selection unit 23 upon completion of inputting of the code of the goods, and the selection unit 23 refers to the event table 23a for the address of the software element A defined above. Further, the selection unit 23 issues an instruction of execution of the software element A thus selected to the execution unit 24.

In response to the instruction, the execution unit 24 carries out the execution of the software element A. More specifically, the execution unit 24 reads the master file of code of goods included in the data file 25c or the master database while using the input data as a key and acquires the information about the code of the goods.

Upon completion of the execution of the foregoing software component A, the execution unit 24 notifies to the selection unit 23 of the completion of the execution. The selection unit 23, in response thereto, refers to the additional event table 23a of FIG. 16 and acquires the address of the software elements B and C both corresponding to the completion of the software component A. Further, the selection unit 23 stores the address of the software element C in the stack 23c and instructs the execution of the software element B to the execution unit 24.

In response to the instruction from the selection unit 23, the execution unit 24 carries out the execution of the software element B. Thus, the "name of the goods" obtained as a result of the execution of the software element A is displayed on the screen, and a notification is made to the selection unit 23 that the execution of the software element B has been completed.

In response to the notification, the selection unit 23 acquires the address of the next software component C from the stack 23c and issues an instruction to the execution unit 24 for the execution of the software component C. The execution unit 24, in turn, carries out the execution of the software component C in response thereto. Thus, the "unit price" obtained by the execution of the software element C is displayed on the screen and a notification is made to the selection unit 23 of the completion of execution of the software component C.

In response to the notification, the selection unit 23 refers to the additional event table 23a for the address of the software component D that is to be executed in response to the completion of the software element C, and issues an instruction for the execution of the software component D to the execution unit 24.

The execution unit 24, in turn, executes the software element D in response thereto. More specifically, an examination is made whether or not the "quantity" is already inputted, and if the result is YES, the "amount of sale" is displayed on the screen based upon the calculation of "quantity" x "unit price." Further, the execution unit 24 notifies of the completion of the execution to the selection unit 23 subsequently.

The selection unit 23 then refers to the additional selection table 23a for the address of the software element E that is to be executed upon completion of the software element D and issues an instruction for the execution of the software element E.

The processing unit 24, in turn, carries out the execution of the software element E in response to the instruction and displays the total amount indicative of the sum of the "amount of sale" on the screen as indicated in FIG. 14

Figure 17:
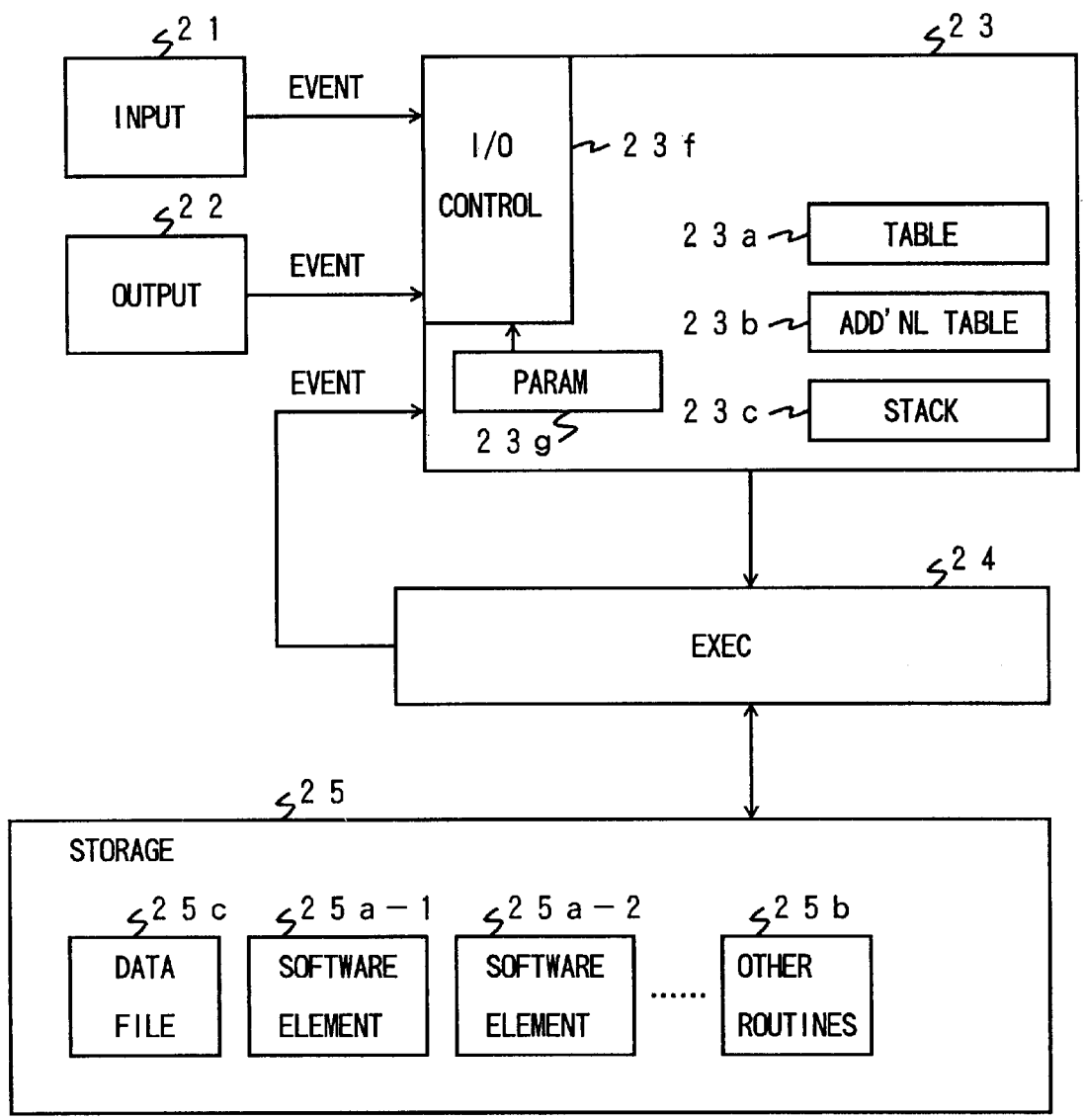
FIG. 17 is a diagram showing the construction of the event-driven processing system according to a second embodiment of the present invention.

FIG. 17 shows a second embodiment of the present invention, wherein the present embodiment uses an additional, input/output control mechanism 23f in the selection unit 23 of the first embodiment as a human-computer interface for achieving input/output control, without affecting the execution of the software components.

Referring to FIG. 17, the input/output control mechanism 23f sets the mode of data input and screen processing based upon the operational parameters set in the parameter setting unit 23g. For example, the input/output control mechanism 23f sets the mode of screen updating such that the update of the screen occurs after the completion of inputting of the entire data items on the screen or such that the update of the screen occurs each time the inputting of data items is made. Alternatively, the input/output control mechanism 23f may set the mode of scrolling of the screen, without affecting the software components, such that a new page is started or such that the screen is scrolled when showing information that overflows the size of the screen. By providing such an input/output control mechanism 23f, it is possible to construct a human-computer interface such that the mode of input/output can be set according to the preference of the user by merely setting the operational parameters in the unit 23g. Further, the input/output control mechanism 23f also carries out the output of information on the magnetic tapes or disks that form another part of the input and output devices 21 and 22.

Figure 18:
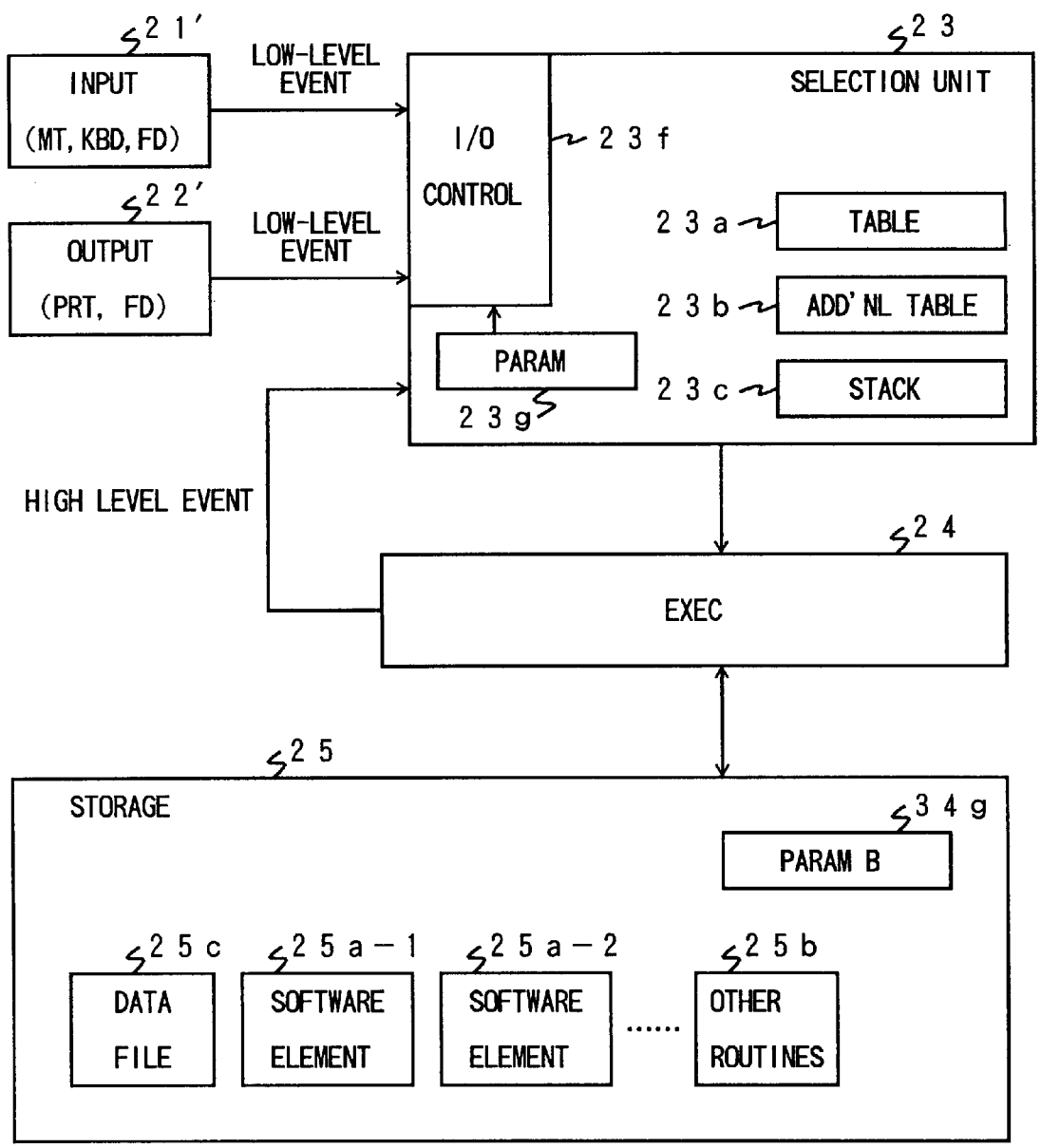
FIG. 18 is a diagram showing the construction of the event-driven processing system according to a third embodiment of the present invention.

FIG. 18 shows a third embodiment of the present invention, wherein the present embodiment includes an input device 21' and an output device 22', the input device 21' includes a keyboard, magnetic tape drive and a magnetic disk drive, while the output device 22' includes a printer, magnetic tape drive and a magnetic disk drive. In the present embodiment, the input/output control mechanism 23f controls the input device 21' as well as the output device 22', wherein the input/output control mechanism 23f includes means for setting the operational parameters both in the selection unit 23 and the storage device 25 such that the parameter setting unit 23g of FIG. 18 includes operational parameters A while operational parameters B are set in another parameter setting unit 34g provided in the storage device 25. The parameters A in the unit 23g set the mode of input/output control carried out by the input/output control mechanism, while the parameters B in the unit 34g set the mode of updating of the data file 25c. Further, by setting the parameters B, one can set the system configuration such as the stand-alone configuration or server-client type configuration, and the like, without modifying the software components $25a_1, 25a_2, \ldots$. About the mode of updating the files, one can select any of the real time updating procedure that completes the update of entire summary files before accepting next data, the concurrent process that updates the summary files while concurrently accepting next data and the batch process that achieves the updating of summary files by a separate batch process while accepting the next data by updating only the transaction files, by merely setting the operational parameters B.

The operation of the system of the present embodiment is essentially the same as the embodiment of FIG. 4. Thus, the selection unit 23 refers to, in response to a notification of event from the input device 21' or output device 22', the event table 23a for the address of the software element $25a_1, 25a_2, \ldots$ that corresponds to the notified event and instructs the execution of the selected software to the execution unit 24. In response to the instruction, the execution unit 24 carries out the execution of the selected software element and updates the data file 25c according to the update mode set by the operational parameters B. Upon completion of execution, the execution unit 24 notifies the completion to the selection unit 23, while the selection unit 23 in turn refers to the additional event table 23a for the address of the software element to be executed next and instructs the execution of the next software element thus selected to the execution unit 24.

Figure 19:
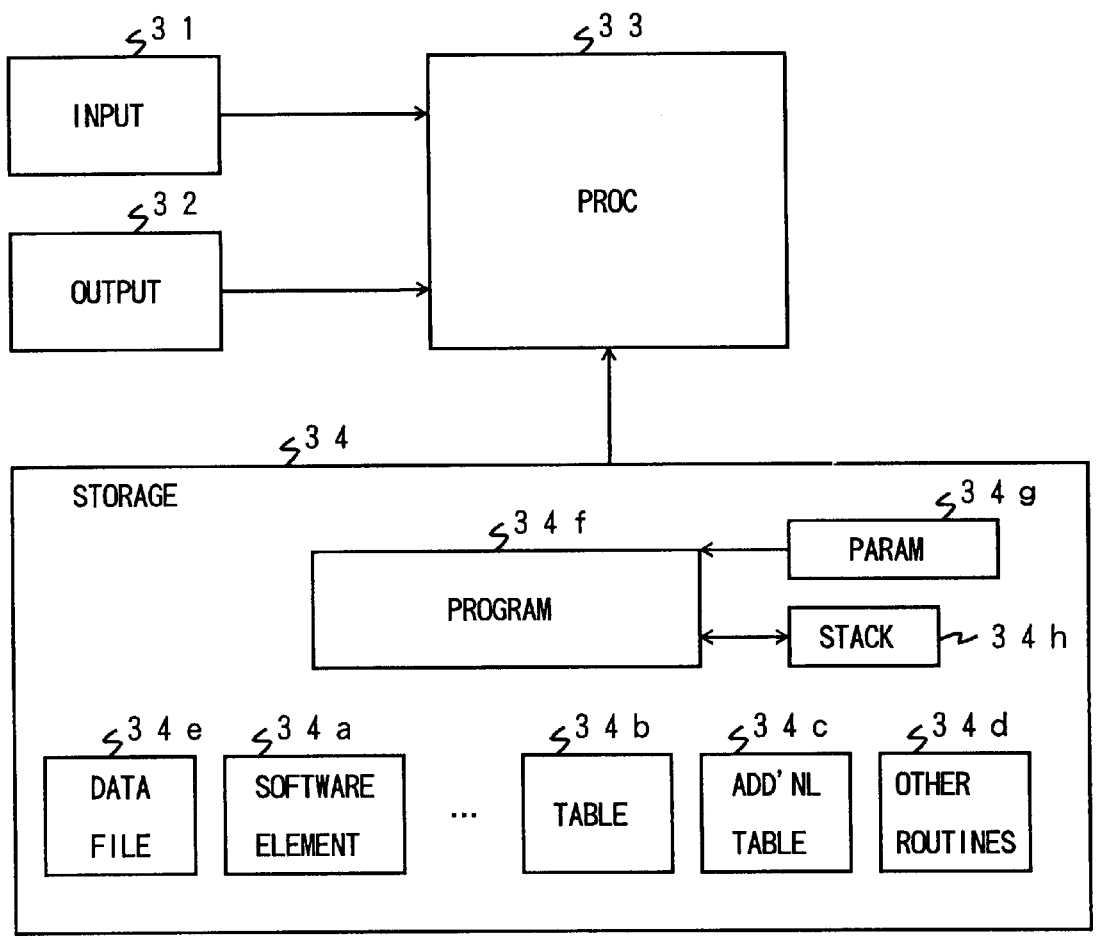
FIG. 19 is a diagram showing the construction of the event-driven processing system according to a fourth embodiment of the present invention.

FIG. 19 shows a fourth embodiment of the present invention, wherein the function that has been carried out by the selection unit 23 in the embodiment of FIG. 4 is now carried out by a processing unit 33.

Referring to FIG. 19, the system of the present embodiment includes an input device 31 and an output device 32 as well as a storage device 34, in addition to the processing unit 33, wherein the storage device 34 stores therein software elements 34a as well as other routines 34d and a data file 34e. Further, the storage device 34 includes an event table 34b and an additional event table 34c respectively corresponding to the event table 23a and the additional event table 23a as well as the control program of the processing unit 33. Additionally, the storage device 34 includes a storage area for storing the operational parameter 34g and a stack 34h for storing the address of the software elements waiting for execution.

The operation of the system of FIG. 19 is substantially identical to those of the first or third embodiment. Thus, in response to the event caused at the input device 31 or the output device 32 that may include a display screen or magnetic devices, the processing unit 33 refers to the event table 34b for the address of the software element that corresponds to the event. The processing unit 33 thereby executes the operation of the software element of which address is thus selected. When there are plural software elements in correspondence to the detected event, the addresses of the pertinent software elements other than the one executed immediately are stored in the stack 34h. Upon completion of the pertinent software element(s), the processing unit 33 refers to the additional event table 34c for the address of the software element to be executed next. By repeating the procedures above, the desired operation of the system is achieved.

FIG. 20 shows a fifth embodiment of the present invention that uses a loader for loading a software element as well as other routines.

Referring to FIG. 20, the processing system includes a loader 35 for loading software elements and routines 36a, 36b, . . . on the storage device 34, wherein the loader 35 further loads various definitions 36c together with the software elements and routines 36a and 36b. The definition 36c may for example include various information such as the position of the data items to be displayed on the screen or the structure of the form for outputting data or the structure of the table that forms a database.

The system of FIG. 20 further includes a sample file, wherein the sample file 36d includes a sample of data items that may be used commonly in various applications. It should be noted that there is a tendency that various software components share a common structure except only for the name of the items or the name of the files. Thus, one can save the resource for developing a new software element by merely loading the sample file 36d on the storage device 34 by means of the loader 35 as well as a software component shown in FIG. 21, wherein the software component of FIG. 21 indicates the substitution of characters in the data items or file names by a given character set to create a new software element.

The operation of the system of FIG. 20 is as follows.

The loader 35 loads the software element 36a (including a software element formed of a plurality of the software elements 36a) as well as other routines 36b, the definitions 36c and the sample files 36d, in the corresponding, respective addresses of the storage device 34. Further, the event table 34b and the additional event table 34c are created based upon the event identifier that is recorded on each of the software elements 36a as well as the address of the storage device 34. Thereby, those functional components as well as the statements of the functional components and the data items that are used commonly between the software components, are arranged to form a single functional component or a single statement at the time of loading by the loader 35. It should be noted that each of the software components includes functional blocks or statement of the items used therein in order to reduce the load of the programmer to pickup individual functional blocks or statement of the data items used in the software components forming an application program. On the other hand, such an approach to include the functional components and the data items in each of the software elements inevitably causes an overlap of the functional components or the statement.

When creating a software component from the sample file 36d, the loader 35 creates the software components from the sample file 36d and the software component of FIG. 21 by substituting the data item name or file name, wherein the software components thus created are stored in the predetermined addresses of the storage device 34 similarly to the software element 36a mentioned before. Simultaneously, the event table 34b or the additional event table 34c are created.

Upon the loading of the software component 34a, event table 34a, and the like, on the storage device 34, the processing unit 33 carries out the execution of the software element 34a as well as other routines in response to the notification of the event from the input device 31 and the output device 32.

In the present embodiment, one may store a sample file 34i in the storage device 34 such that the software element 34a is automatically created when the user has omitted the input of the item. In such a case, the absence of the software element triggers the creation of the software element 34a.

For this purpose, the sample file 34i is stored in the storage device 34 in advance, such that the loader 35 substitutes the data items in the sample file 34i based upon the data items defined by the definitions 36c. As a result, the software element 34a is automatically created and stored in the storage device 34.

According to the foregoing process described above, it is possible to create the software element 34a without inputting the software elements that specifies the substitution of the data items.

Figure 22:
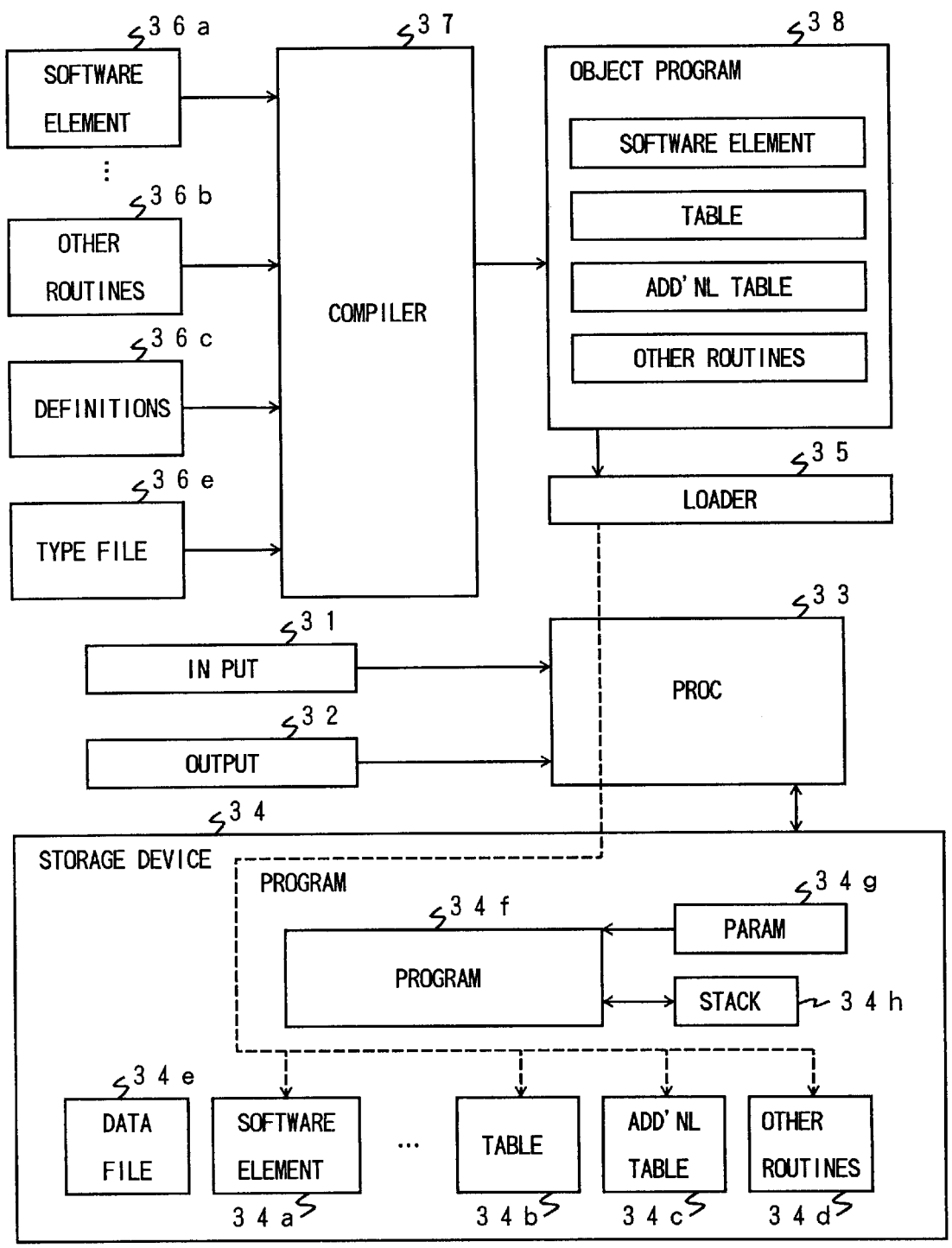
FIG. 22 is a diagram showing the construction of the event-driven processing system according to a sixth embodiment of the present invention.

FIG. 22 shows a sixth embodiment of the present invention, wherein the present embodiment creates an object program by compiling the software elements described in the form of the source program by a compiler 37. The object program 38 thus created is loaded on the storage device 34 by means of the loader 35. Further, a type file 36e for defining the type of the data items is supplied to the compiler 37 for specifying the type of the data. In FIG. 22, it should be noted that the type file 36e is a file for defining the type of the data item such as the attribute (numeric or character) and the length of the data.

The type of the data item used in the software element or software component is not directly defined in the form of statement but by defining the type. The content of the type is defined separately by the type file 36e. As a result, one can easily achieve modification of the content of the type by merely redefining the type, without modifying the statement in the pertinent software element or software component.

For example, one may define the data type of the data items such as "client name," "preferred client name," "former client name," etc., in the software components or software elements collectively by the statement NAME TYPE-CLIENT as indicated in FIG. 23(A) and define the data type of NAME TYPE-CLIENT separately by way of the type file 36e, such that NAME TYPE-CLIENT includes twenty characters, for example.

FIG. 23(B) shows the statement of the data items in the software elements and software components wherein the type file is not used. As will be noted, the software elements or software components in FIG. 23(B) include various statements of the data items which have to be modified when the data type is changed as in the case of changing the number of the characters.

Similarly, one may easily modify the item for the telephone number from a data type that uses eight numeric characters to another data type that uses ten numeric characters, by merely modifying the definition of the pertinent data type in the type file 36e, without modifying the content of the software elements or software components at all.

In the construction of FIG. 22, the compiler 37 creates an object program in response to the input of the software element 36a, the routines 36b, and the type files 36e, which are written in the form of source program. Simultaneously to the compilation, the event table and the additional event table are created based upon the address and the identifier of the software element 36a, and the compiler 37 converts the type of the data items defined indirectly in the software element 36a into the data type that is defined in the type file 36e. Similarly to the fifth embodiment, those statements of the data items and the functional components that overlap with each other in various software elements and software components are assembled into a single statement.

The object program 38 thus created is loaded on the storage device 34 by a loader 35, and the processing unit 33 executes the processing of the software elements 34a or other routines on the storage device 34 in response to the notification of the event from the input device 31 or the output device 32.

In the present embodiment, it is also possible to create a software component by sending the sample file to the compiler 37 similarly to the fifth embodiment. Further, it is possible to store the sample file in the storage device 34 such that the software components are created automatically. In addition, it is possible to modify the fifth embodiment in view of the teaching of the sixth embodiment to feed the type file to the loader to create the software components having a defined data type.

Figure 24:
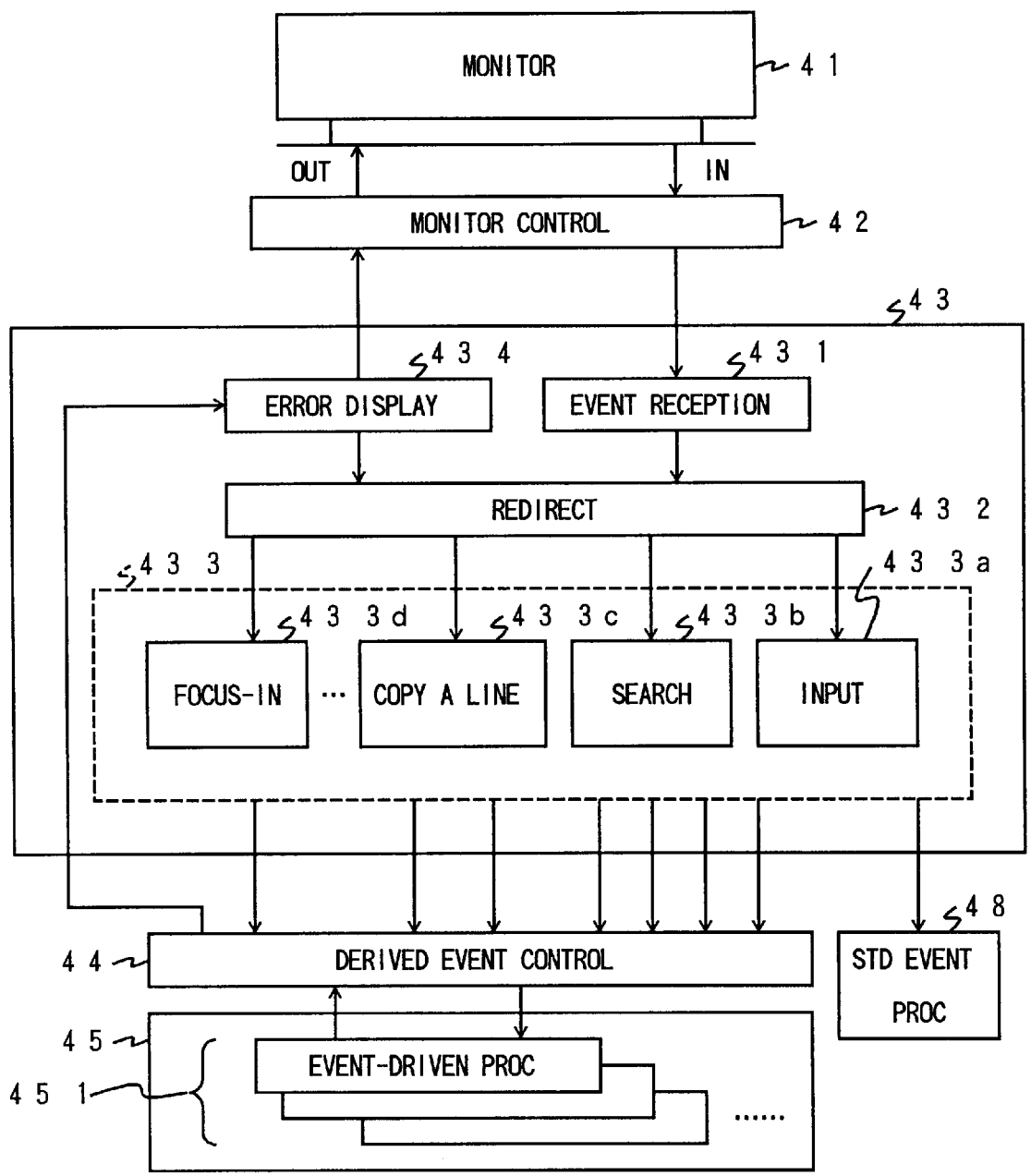
FIG. 24 is a diagram showing the construction of an event-driven processing system according to a seventh embodiment of the present invention.

FIG. 24 shows a data processing system according to a seventh embodiment of the present invention. Referring to FIG. 24, the data processing system includes a monitor 41 for displaying information supplied thereto via an input/output control unit 42, wherein the control unit 42 further controls other input/output devices such as a keyboard not shown in FIG. 24. The control unit 42 monitors various low-level events such as the inputting of data, selection of a menu, pressing-down of a function key, and the like, and reports the occurrence of the low-level event to an event control unit 43, wherein the event control unit 43 converts the reported low-level event to one or more high-level events. The event control unit 43 also creates a high-level event in response to the internal state and timing of the operation.

Referring to FIG. 24, the event control unit 43 includes an event reception unit 431 for receiving the notification of the event from the input/output control unit, wherein the reception unit 431 forwards the low-level event to a redirection unit 432, and the redirection unit 432 directs the low-level event selectively to a selected one of event conversion units 433a–433d that form collectively an event conversion unit 433 for conversion to a high-level event, wherein the conversion units 433a–433d convert the low-level event supplied thereto to one or more high-level events as mentioned previously. The conversion units 433a–433d are provided in correspondence to the various low-level events, wherein the conversion unit 433a corresponds to the event for the completion of input, the conversion unit 433b corresponds to the event for the execution of search, the conversion unit 433c corresponds to the event for the copying of description lines, and the conversion unit 433d corresponds to the event of focusing-in. Further, the event control unit 43 includes a display control unit 434 for controlling the monitor 41 and displaying the error.

The conversion units 433a–433d send the notification of respective high-level events to a derived-event control unit 44, wherein the derived-event control unit 44 activates a suitable event-driven software component 451 that is stored in a storage device 45. For example, a high-level event for updating the value of a data item may trigger the activation of associated event-driven software components 451 for these items that experience the effect of updating.

Further, the system of FIG. 24 includes a functional component 48 that is used commonly by the software components 451. For example, the functional component may be an initialization process that sets the status of the data items in the state of no data entry.

In the system of FIG. 24, it will be noted that system includes the event control unit 43 wherein the event control unit 43 converts various low-level events to a small number of high-level events such as the checking event for checking the input data or the derived events that do not depend directly upon individual low-level events. Further, the storage device 34 includes an assembly of the software components 451 driven in response to the high-level events. Thus, the application program is completely separated to the skeleton part that changes little with the modification of the application software and to the event-driven software components 451, wherein the skeleton part merely supervises the execution of the software components 451 and the actual modification of the software is achieved merely by rewriting the pertinent software component(s). Thereby, the software components 451 form a method that is driven in response to an event or message as in the object-oriented system, in contrast to the conventional system that treats the application related part as subroutines called by the skeleton part. In FIG. 24, the event control unit 43 and the derived-event control unit 44 form the skeleton part that is more or less common in various versions of the application software, while the event-driven software components 451 forms the part that have to be modified by the programmer when revising or modifying the application software.

Figure 25:
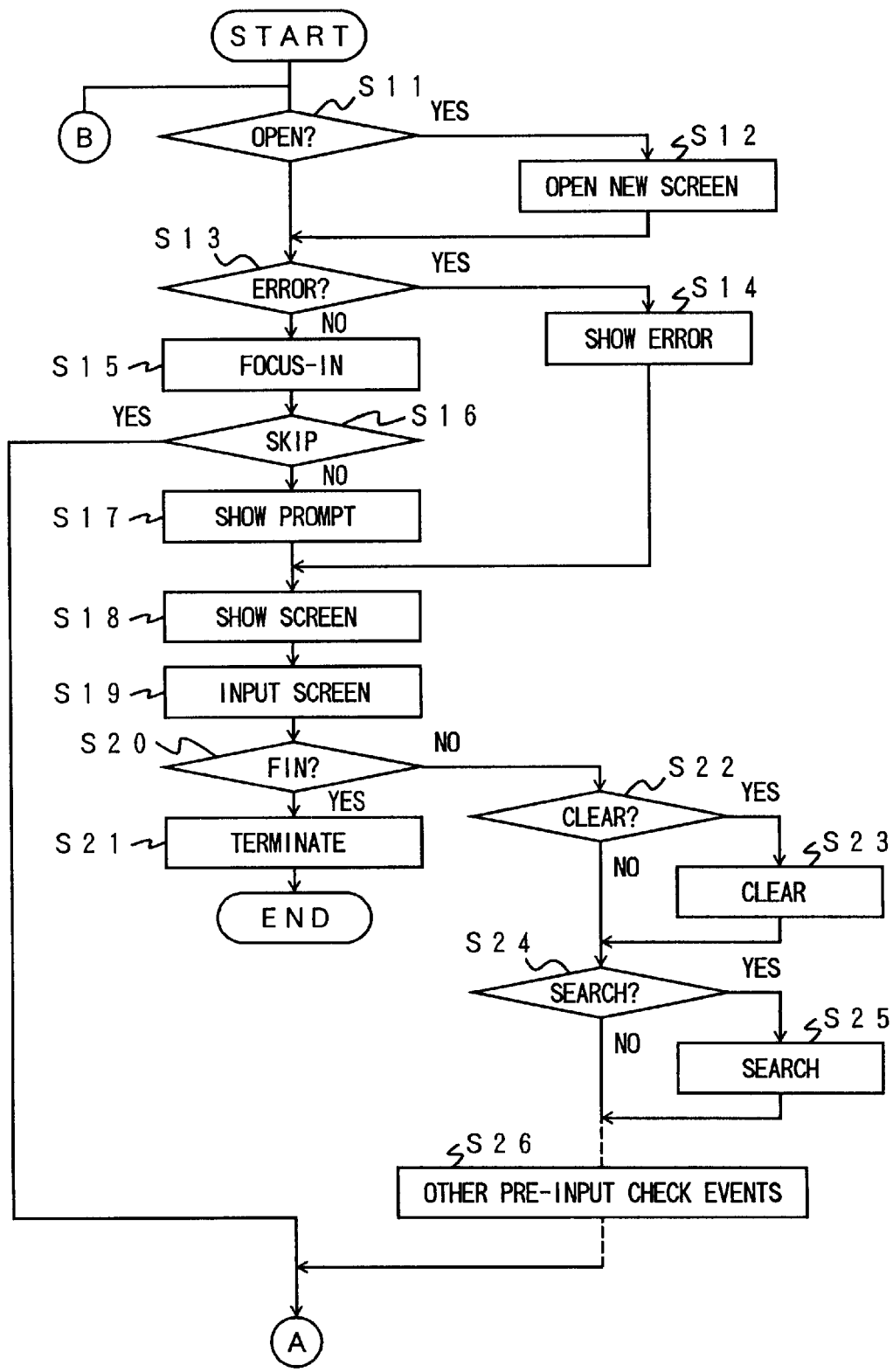
FIGS. 25 and 26 are diagrams showing the overall operation of the system of FIG. 24.
Figure 26:
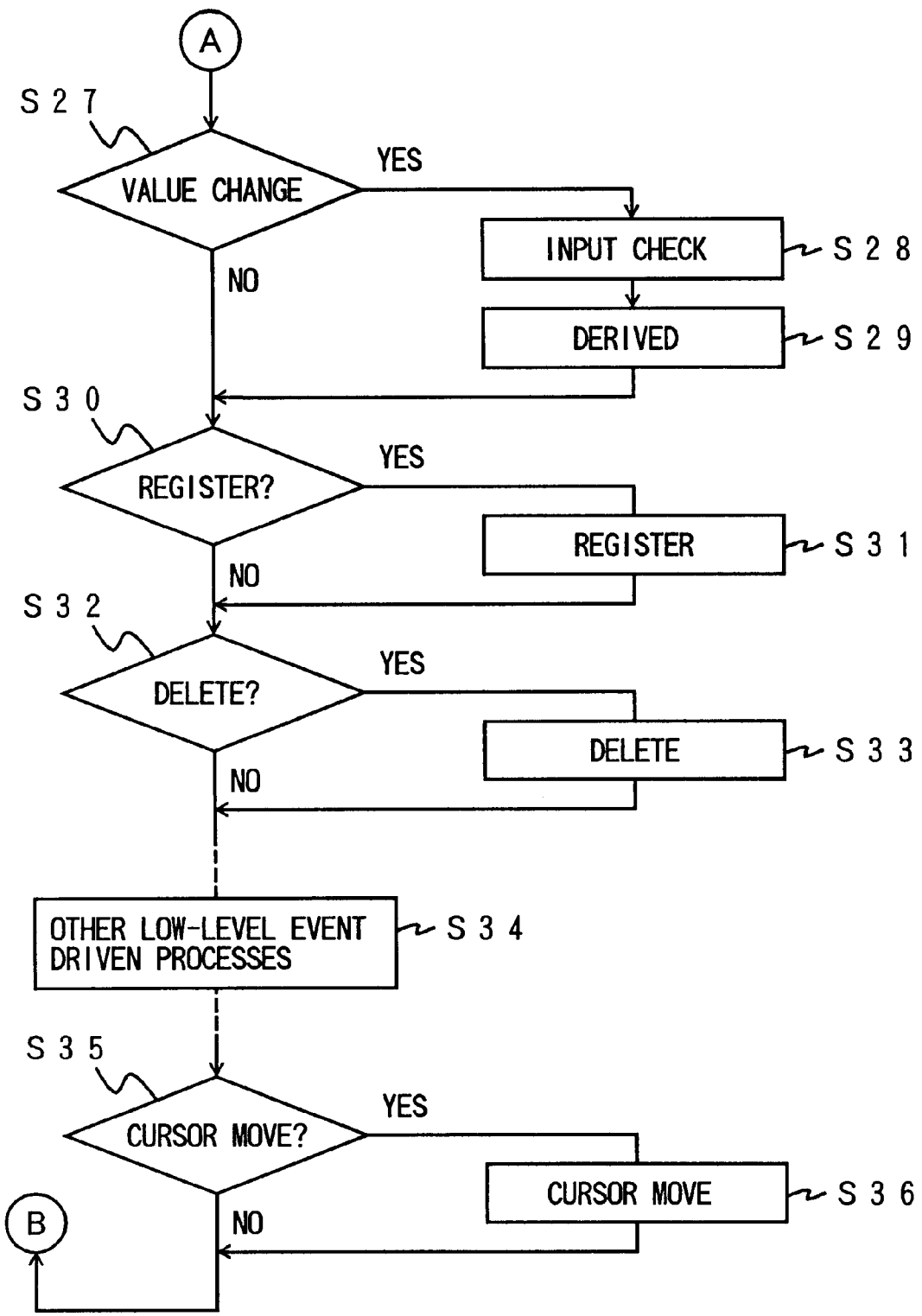

Next, the operation of the system of FIG. 24 will be described with reference to FIGS. 25 and 26, wherein FIGS. 25 and 26 show an example of the operation of the unit 43 of FIG. 24 for processing the events related to screens. As described already, the high-level event includes events related to screens, events related to forms, and events related to table items or database.

Referring to FIG. 25, an examination is made in the event control unit 43 of FIG. 24 whether or not there is an instruction for opening a new screen in a step S11, and if the result is YES, a new screen is opened in a step S12. An opening screen is activated when the application software is started.

Next, in a step S13, an examination is made whether or not there is an error, and if the result is YES, a display of error is made in a step S14 and the process jumps to a step S18. When there is no error, a step S15 is carried out for calling a focusing-in process. As noted before, the focusing-in is carried out when the cursor hits the location of a new data item on the screen.

Next, in a step S16, an examination is made whether or not there is a instruction for a skip (forced focusing-out), and if the result is YES, the steps following a step S27 are carried out, while when the result of examination is NO, a step S17 is carried out.

In the step S17, a prompt message is displayed on the monitor screen and a step S18 is carried out for displaying the updated content of the screen. Further, a step S19 is carried out, waiting for the input from the screen.

When it is judged in a step S20 that a command for ending the process has come in, a termination process in a step S21 is carried out and the process of the system is terminated. When there is no command for termination the process of the step S20, on the other hand, process steps following a step S22 are carried out.

In the step S22, a discrimination is made whether there is an instruction for clearing the screen is issued or not, and if the result is YES, a step S23 is carried out for clearing the screen. When the result is No, on the other hand, a next step S24 is carried out. In the step S24, an examination is made whether or not there is an instruction for a search, and if the result is YES, a search process is carried out in a step S25. When the result of examination in the step S24 is NO, on the other hand, a step S26 is carried out, wherein the detection of various low-level events and activation of the corresponding event-driven routines are carried out, similarly to the clearing of the screen in the step S23 or the search in the step S24.

The process further proceeds to a step S27 of FIG. 26, wherein an examination is made whether or not there is a modification of value in the items. In the event that there is an input from the screen in the step of S19, the step S27 judges that there has occurred a modification of value in the items in response to the low-level event of completion of input, and the process in a step S28 is carried out. The modification of the value of the items include not only the modification of preexisting data but also the input of data to a blank item.

In the step S28, it should be noted that the modification of the value is notified to the event reception unit 431 of FIG. 24 forming a part of the event control unit 43, wherein the event control unit 43 creates in response thereto an input-check event for the data item of which value has been modified, as a high-level event. In response to the input-check event thus created, an input-check routine forming a part of the event-driven processes 451 of FIG. 24 is activated. In the case that derived processes are defined in the data items that are affected by the modification of the foregoing data item, the derived processes are also activated.

In the processes from a step S30 to a step S34, the type of the event is identified and a corresponding process is carried out. For example, the step S30 detects a low-level event corresponding to the instruction for data registration, while the step S31 carries out the process of the data registration.

Further, the step S32 detects the low-level event of deleting data from an item and the step S33 carries out the delete of the corresponding data.

Further, a step S35 detects the low-level event corresponding to the instruction for moving a cursor, and the corresponding movement of the cursor is achieved in a step S36.

By repeating the steps S11–S36, various processing routines that are driven in response to the high-level events such as the input check routine and related routines derived therefrom are carried out.

Next, a more specific example of the foregoing process of the seventh embodiment will be described with reference to FIG. 27 as an eighth embodiment, wherein FIG. 27 shows an example of the screen similar to FIG. 14.

Referring to FIG. 27, the screen shows various items corresponding to a buying-in slip 110 such as an item 111 for the name of the client, an item 112 for the class of taxation, an item 113 for the "name of the goods," an item 114 for the "unit price," an item 115 for the "quantity," an item 116 for the "amount of sale," and an item 117 for the total amount of sale.

In the slip 110 of FIG. 27, it will be noted that the item 111 for the client name and the item 112 for the class of taxation form a header part, while the item 113 for the "name of the goods," the item 114 for the "unit price," the item 115 for the "quantity," and the item 116 for the "amount of sale," form a body part of description corresponding to the foregoing body description area of FIG. 14, wherein the body part includes an array of items forming a number of description lines. Further, the item 117 for the total amount of sale forms the tale or footer part. In the description hereinafter, it is assumed that the layout of the screen for the slip 110 is already defined by any well known procedure.

FIGS. 28(A)–28(D) show the examples of the event driven processes 451, wherein FIG. 28(A) shows an event-driven routine 451A that is related to the item 111 for the client name. The event driven routine 451A includes a statement of "CHECK SECTION" that indicates an activation of an input check routine upon the event of data input to the item 111 for the client name. In the check routine defined by the statement "CHECK SECTION," the record corresponding to the value input for the item 111 for the client name is read out from a database. Further, the class of taxation is transferred from a master file to the item 112 for taxation. Such a process may be written by a program language such as COBOL.

FIG. 28(B), on the other hand, indicates an event-driven routine 451B related to the item 113 for the "name of the goods," wherein the event-driven routine 451B also includes the "CHECK SECTION" for the activation of the input check routine upon the event of data input to the item 113. In the input check routine for the item 113, the record corresponding to the input value of the item 113 is read out from the database and the data for the "unit price" of the goods is written into the item 14 from the master file.

FIG. 28(C) indicates an event-driven routine 451C related to the item 116 for the "amount of sale" and includes the "DERIVED SECTION" statement indicating that the event-driven routine 451C is activated as a derived routine in response to a modification of data in the source data items. In this case, the source items include the data item 114 for the "unit price" and the data item 115 for the "quantity" as bracketed in FIG. 28(C). Thus, the event-driven routine carries out a calculation of the "amount of sale" by multiplying the "unit price" in the data item 114 and the "quantity" in the data item 115, provided that both of the data items 114 and 115 hold data. The "amount of sale" thus calculated is further written into the item 116 for the "amount of sale."

FIG. 28(D) indicates an event-driven routine 451D related to the item 117 for the total amount of sale and includes the "DERIVED SECTION" statement indicating that the event-driven routine 451D is activated as a derived event-driven routine triggered in response to a modification of data in the source items bracketed in FIG. 28(D). In this case, the source items include the data item 116 for the "amount of sale." Thus, when there is a modification in the "amount of sale" in the item 116, the event-driven routine 451D calculates the total of the "amount of sale" and adds the commodity tax, if necessary, in view of the content of the item 112 for the class of taxation. The "amount of sale" thus obtained is written into the item 17 for the total amount of sale.

In the example of FIGS. 28(A)–28(D), only one event-driven routine is defined for a given data item, while there are cases wherein a plurality of event-driven routines are defined for a given data item. In the present embodiment, there may be additional event-driven routines such as INITIALIZE SECTION, FOCUSING-IN SECTION, in addition to the CHECK SECTION.

Next, typical examples of the high-level event will be shown in comparison with the low-level events, with particular reference to the buying-in slip 110 of FIG. 27.

(a) INPUT PROCESSING

When an input of the client name such as "XXXX, INC." is made to the data item 111 in FIG. 27 in the step S19 of FIG. 25, the step S27 of FIG. 26 detects the change of the content of the data item 111 and the CHECK SECTION of the event-driven routine 451A of FIG. 28(A) is called in the step S28 of FIG. 26. In response thereto, the corresponding record is read out from the database by the event-driven routine 451A and the taxation class is copied from a master file.

The process of the following step S29 of FIG. 26 is skipped because of the absence of the definition of the derived section that corresponds to the client name. In the step S35, the movement of the cursor to the next data item is achieved, wherein the data item 113 for the "name of the goods" is selected as the current data item. After this, the process returns to the beginning of the loop, and the client name and the class of taxation are displayed in the step S18. In the event that the database includes a record indicating that there will be no commodity taxation, for example, the data item 112 on the screen indicates "no commodity taxation."

Next, an entry of the "name of the goods" such as "ball-point pencil" is made to the current data item 113 in the step S19 of FIG. 25, wherein the step S27 of FIG. 26 detects the modification of value of the data item 113 and calls the CHECK SECTION in the event-driven routine 451B of FIG. 28(B) in the step S28. The event-driven routine 451B reads the corresponding record from the database and copies the "unit price" from the master file. As the routine 451B includes no derived routines, there are no data items that are affected by the "name of the goods," and the step S29 for the process of derived routines is skipped. Thus, steps S35 and 36 are carried out for moving the cursor such that the data item 115 for the "quantity" is selected for the next data entry. After this, the processing returns to the beginning of the loop and the "name of the goods" and the "unit price" ("500" in the illustrated example), copied from the database, are displayed on the screen in the step S18.

In the next step S19, the data such as "20" is entered to the data item 115 for the "quantity," and the step S27 of FIG. 26 detects the change of content of the item 115. As the data item 115 for the "quantity" does not include the definition of the CHECK SECTION, the step S28 is skipped. On the other hand, the event-driven routine 451C of FIG. 28(C) for the "amount of sale" does include the statement DERIVED SECTION that defines a derived process derived from the data item 115 for the "quantity." Thus, the derived routine is activated in the step S29. In the derived process, the "amount of sale" is calculated based upon the data item 114 for the "unit price" and the data item 115 for the "quantity," by multiplying the value for the data item 115 to the value for the data item 114, and the value thus calculated such as "10,000" is set in the data item 116.

Upon modification of the data item 116 for the "amount of sale," the derived section that is derived from the "amount of sale" is searched for. Such a derived section is defined in the event-driven routine 451D of FIG. 28(D) as indicated by DERIVED SECTION. In the present example, the class of taxation indicates "no commodity tax," the DERIVED SECTION carries out a simple summation of the "amount of sale" and sets the value thus obtained in the data item 117 such as "10,000." After this, the steps S35 and S36 are carried out for moving the cursor to the next data item 113 corresponding to the name of the next goods. Further, the process returns to the beginning of the process of FIG. 25, wherein the data such as "quantity," "amount of sale," and the total amount of sale are all displayed on the screen in the step S18.

A similar processing is carried out for the "fountain pen" in the second line of description of the buying-in slip 110, wherein the data "3,000" is set in the data item 114 for the "unit price" and the data "5" is set in the data item 115. Next, the DERIVED SECTION in FIG. 28(C) is called, and the "amount of sale" of "15,000" is calculated by multiplying the "quantity" to the "unit price." The "amount of sale" thus calculated is set to the data item 116. Upon setting of the new value thus calculated to the data item 116, it is judged in the step S27 of FIG. 26 that the data item 116 is modified, and the DERIVED SECTION in the event-driven routine 451D of FIG. 28(D) is called. As a result, a total amount of "25,000" is obtained and set in the data item 117.

By repeating the foregoing processes, the execution of the process by the event-driven routines 451A–451D is controlled by the skeleton part of the application software, while the application-specific, individual processing are carried out by the event-driven routines 451A–451D. Such an application-specific part of the application software is written for each of the data items in the form of CHECK SECTION or DERIVED SECTION, while there is little need for the modification of the skeleton part of the program.

(b) COPY OF DESCRIPTION LINES

When copying lines in body part of the slip of FIG. 27, there arises a problem in that the value of the total amount of sale becomes no longer correct after copying a line. Hereinafter, the solution of this problem will be described.

It should be noted that the copying of lines in the description shown FIG. 27 is carried out by the conversion unit 433c included in the unit 433, wherein the conversion unit 433c emulates the input of the individual data items which has been copied. Thus, the conversion unit 433c creates a logic or high-level event in response to the copying of data from a source data item similarly to the case that the copied data has been entered from the screen. As a result, the processes such as check of the data, recalculation of the derived items, reading of the database, and the like, are carried out in response to such a high-level event.

Figure 29:
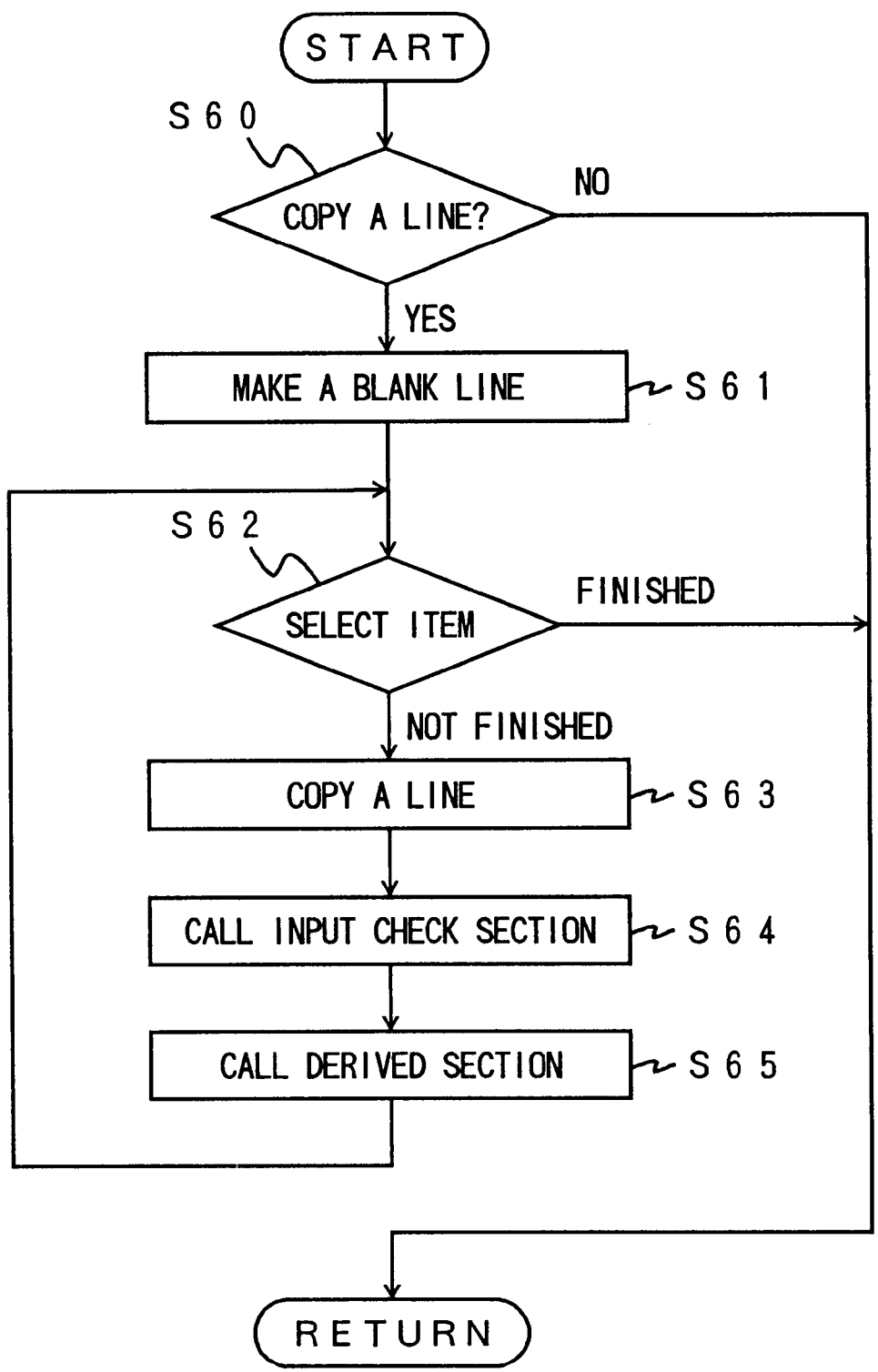
FIGS. 29–37 are diagrams showing the operation of various event-driven routines in the system of FIG. 24.

FIG. 29 shows the flowchart for copying a description line. Referring to FIG. 29, the process of FIG. 29 is activated in response to the step S19 of FIG. 25 for instructing the copying of a description line, wherein the process of FIG. 29 corresponds to the step S26 of FIG. 25.

First, a step S60 is carried out for examining whether or not there has been an occurrence of a low-level event instructing the copying of a description line. The low-level event may be given in response to the selection of a menu or pressing-down of a specific function key and is notified via the display control unit 42 of FIG. 24. When the result of the examination is YES, the processes of the step S61–S65 are carried out.

In the description hereinafter, it is assumed that there has been an instruction to copy a first line in the state that the buying-in slip 110 of FIG. 27 includes already two or more description lines in the body description area. The instruction to copy may be given by the operator in the step S19 of FIG. 25 by selecting the first line by the cursor accompanied by the action of pressing-down a function key or selection of a menu as already noted.

In response to the instruction, a step S61 is carried out, wherein those existing lines except for the first line, are moved downward such that a blank line is formed in the second line of the body description area. Further, in a step of S62, an item to be processed is selected, wherein, in the present case, there are pertinent items 113 and 115 respectively indicating the "ball-point pencil" and the "quantity." Thus, steps S63–S65 are carried out first with respect to the data item 113.

In the step S63, the content "ball-point pencil" of the data item 113 is copied to the second, blank line. Further, in the step of S64, the CHECK SECTION in the event driven routine 451B of FIG. 28(B) is called and the input check routine is carried out. As a result, the "unit price" is copied from the master file.

Next, in the step S65, a derived process derived from the foregoing event is carried out. In the present case of the data item 113 for the "name of the goods," there is no derived processes. Thus, the step S65 is skipped and the process returns to the step S62, wherein the next data item 115 for the "quantity" is selected in the step S62.

After the step S62, the step S63 is carried out, wherein the value "20" in the data item 115 of the first line is copied to the second line. Further, an input check process is carried out in the step S64, while the step S64 is actually skipped due to the absence of the definition in the input check section in the item 115 for the "quantity." Further, the process processes to the step S65.

In the step S65, the derived processes derived from the data item 115 are carried out. As a result, the data item 116 is obtained by calling the DERIVED SECTION in the event-driven routine 451C of FIG. 28(C). The "amount of sale" thus obtained is set in the data item 116 of the second line.

The foregoing process causes a change in the data item 116 for the "amount of sale," wherein such a change in the data item 116 inevitably causes a corresponding change in the total amount of sale. Thus, the DERIVED SECTION in the event-driven routine 451D of FIG. 28(D) derived from the "amount of sale" 115 is called, and the total amount of sale is calculated by summing the "amount of sale" for the first through third lines. The value thus obtained is set in the data item 117. After this, the process returns to the step S62.

In the step S62 thus returned, there is no longer any data items to be processed and the process for copying is skipped. As there is no modification of value or movement of the cursor, the process loops back to the first step of FIG. 25, and the line copied in the step S18 as well as the "total amount of sale" modified as a result of the copying, are displayed. Thereafter, the system waits for incoming of new data.

(c) DELETE OF DESCRIPTION LINES

Similarly to the case of copying description lines, the deletion or removal of description lines causes a corresponding change in the "total amount of sale."

Figure 30:
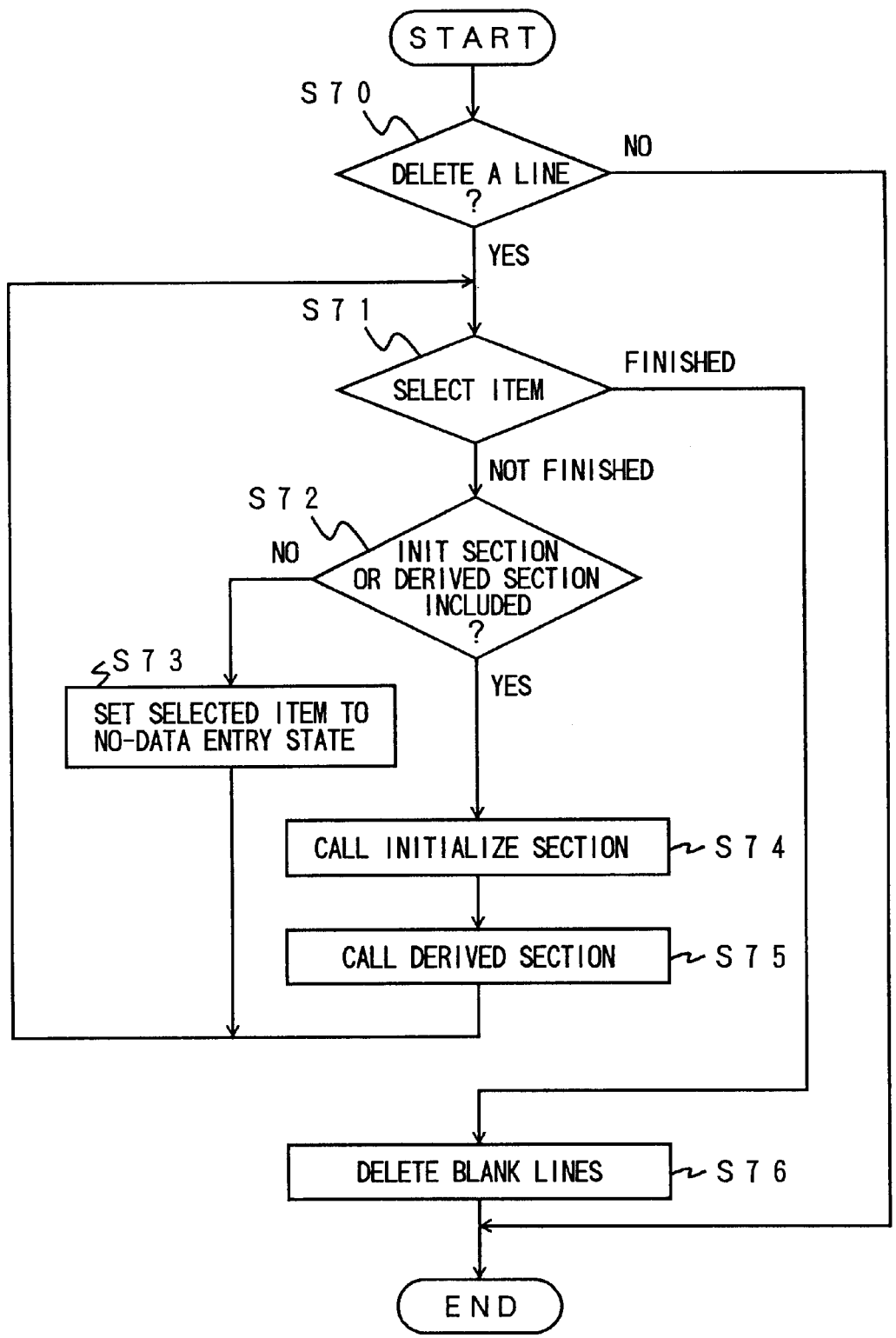

FIG. 30 is a flowchart for deleting a description line according to the present invention, wherein it will be noted that the processes of steps S70–S76 correspond to the step S26 of FIG. 25. In the description below, it is assumed that there are already two or more lines in the body description area. In the step S9, it should be noted that the operator moves the cursor to the line to be deleted, wherein the line may be the first line. Further, the function key is pressed down or a menu is activated and the instruction for deleting the specified line is issued. The instruction is then notified to the event control unit 43 as the occurrence of a low-level event.

In the step of S70, the occurrence of the event for removal of a specific line is examined, and if the result is YES, the step S71 is carried out for selecting a data item included in the description line to be deleted. Next, the steps S72–S76 are carried out first with respect to the first data item selected in the step S71. Thus, in the step S72, an examination is made whether or not there is an initialization section defined by the statement INIT SECTION for activating the initializing routine or a derived section defined by the statement DERIVED SECTION for activating the derived routine. As the first item lacks any of the INIT SECTION statement and the DERIVED SECTION statement, the process proceeds directly to the step S73, wherein the data item 113 is set for the state wherein no input is made yet.

After the step S73, the process returns to the step S71, wherein the data item 114 for the "unit price" is selected. After the step S71, the process proceeds further to the step S72 for the examination of initialization sections and derived sections. It should be noted that the result of the examination becomes YES in the present instance wherein the data item 114 is for the "unit price" is selected. See the event-driven routine 451C of FIG. 28(C) for the data item 116 for the "amount of sale." The data item 116 is derived from the "unit price" and the "quantity."

As a result of examination in the step S72, which is YES, the process now proceeds to the step S74. As the data item 114 for the "unit price" lacks the statement INIT SECTION for initialization, the data item 114 is set to the state that no unit price data is entered yet. It should be noted that the process for setting the state of the data item 114 is carried out by a standard event-driven processing unit 46 shown in FIG. 24.

In the step S75, the derived section of the item 116 derived from the "unit price" is called. As the item 114 for the "unit price" has been set previously to the state of no data entry, there occurs no material operation in the step S75. Further, the derived section of the item 117, derived from the "amount of sale," is called. As the "amount of sale" for the line to be deleted is invalid data, the total amount of sale calculated in this step is also invalid.

Further, the process returns to the step S71 for the next data item, wherein processes similar to the processes described above are carried out for the data item 115. As the data item 115 for the "quantity" does not include the initialization section, the data item 115 is set to the state where there is no data entry, and derived section of the data item 116 derived from the "quantity" is called. As the data item 115 is already set to the state of no data entry, such an execution of the derived section does not include any material process. Further, the derived section of the data item 117 for the "total amount of sale" derived from the "amount of sale" is called. As the data thus obtained is invalid in view of the absence of data entry of the data item 115 for the "quantity," the "total amount of sale" thus obtained is also invalid.

In the step S71 of the next loop, the cursor is now moved to the data item 116 for the "amount of sale." In this case, the event-driven routine 451C of FIG. 28(C) for the data item 116 includes a derived section and the result of examination in the step S72 becomes YES. In this case, the process proceeds to the step S74.

As the step S74 does not include an initialization section, the "amount of sale" for the data item 116 is set to the state of no data entry, and the process proceeds further to the step S75. In the step S75, the derived routine, which is derived from the "total amount of sale" is called. In the present instance, one obtains a correct total because of the fact that the "amount of sale" for the line to be deleted is already set to the state where there is no data entry.

In the following step S71 for the next loop, all the data items are already processed. Thus, the process proceeds to the step S76, wherein the first line, in which all the data items are set to the state of no data entry, is deleted. Further, the lines that follow the deleted line are moved upward respectively by one line. After the step S76, the process returns to the beginning of FIG. 25, wherein the result of the deletion and the total amount that incorporates the effect of deletion are displayed on the monitor screen in the step S18. Further, the system waits for the new data entry in the step S19.

In the foregoing examples of copying or deleting a line, it will be noted that the activation of the event-driven routines 451 does not occur in response to the low-level events such as manipulation of the function key for copying a line or deleting a line. It is sufficient for the side of the application software to describe only those processing executed in response to the input check events and the derived events.

Next, examples of converting other physical or low-level events to logic or high-level events will be described.

(d) EXECUTION OF SEARCH

When executing a search, the application software reads a record from a database and sets a value in a screen. Generally, the record that is read from a database includes only the key items that are essential, while those data items that are determined from the data of other databases or data items that can be easily calculated are not included. On the other hand, the data items displayed on the monitor screen include various data items other than the data items obtained from a database.

In the present embodiment, a high-level event is created as if the key item has been inputted from a screen. The application software thereby regards data as being given from the screen in response to the high-level events such as the input check event or derived event, and obtains the content corresponding to the data by reading a database or by a calculation. The event control unit 43 thereby treats the value or content that the application program has obtained as a screen record screen and displays the same on the screen.

Figure 31:
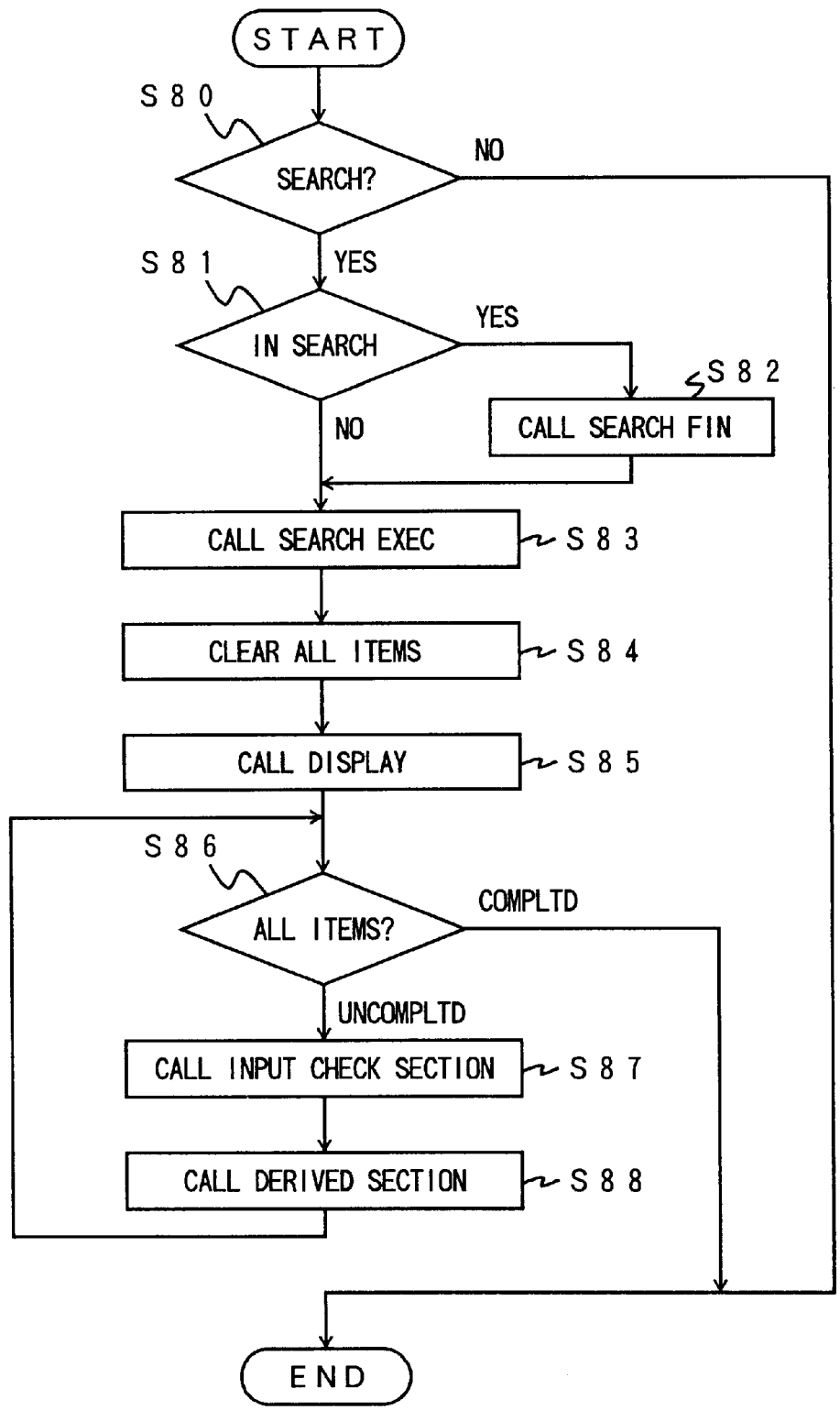

FIG. 31 shows a flowchart of a search process activated in response to a low-level event for instructing a search, wherein the process includes a step S80 corresponding to the step S24 of FIG. 25 and steps S81–S88 corresponding to the step S25.

In the step S80, an examination is made whether or not there is an input for commanding a search in the step S19 of FIG. 25. If the result is NO, the steps that follow the step S80 are skipped. On the other hand, when there is such a command or instruction in the step S19, an examination is made in a step S82 whether or not a search is in progress. In the result of the step S82 is YES, a step S82 for terminating the search is called and the search process is terminated. If the result is NO, on the other hand, a step S83 is carried out.

In the step S83, a routine for executing a search is called wherein a search is conducted in a database. Further, all the data items are cleared in a step S84, and a display routine for displaying the result of the search is called in a step S85. The result of search is displayed on the screen.

After the step S85, a step S86 is carried out for discriminating whether or not the processing is completed for all of the data items. If the result is NO, a step S87 is carried out for calling an input check section when such an input section is defined for the data item of which value has been set as a result of the search. The input check section thus called achieves a predetermined check procedure to the corresponding data item.

Further, a step S88 is carried out, wherein a derived section is called in the step S88, provided that there is defined a derived section derived from a data item of which value has been set as a result of the search. Further, the processing of the application are conducted for those data items that are influenced by the foregoing source data item.

Next, the operation returns to the step S86 and a similar processing is repeated. When it is judged in the step S86 that there is no remaining data item, the search process is terminated.

(e) INPUT OF HEADER ITEMS AFTER INPUT OF DESCRIPTION LINES AND CORRECTION

In the forms such as the foregoing buying-in slip 10 that includes a header area, body area for the description lines, and the tail area, the content of the data items in the description lines or in the tail area are generally influenced by the content of the data items in the header area. In the case of the buying-in slip 10, for example, the content of the data item 17 for the "total amount of sale" may be changed depending upon the content of the data item 12 for the taxation. Thus, when there is an additional input or modification in the header items, it is necessary to recalculate the content of the data items in the description lines and the tail area.

In operation, the conversion unit 433 carries out, when data for the header item is inputted or modified after an input to the description lines has been made, an input emulation process with regard to those data items listed below the modified data items. Thus, for each of the data items, a high-level event is created as if the data for the data item is inputted from the screen, and processes such as a check of the data by the input check section, which is described in the form of application program, a re-calculation of the data items derived by the derived sections, or a re-reading of the database, are carried out.

Figure 32:
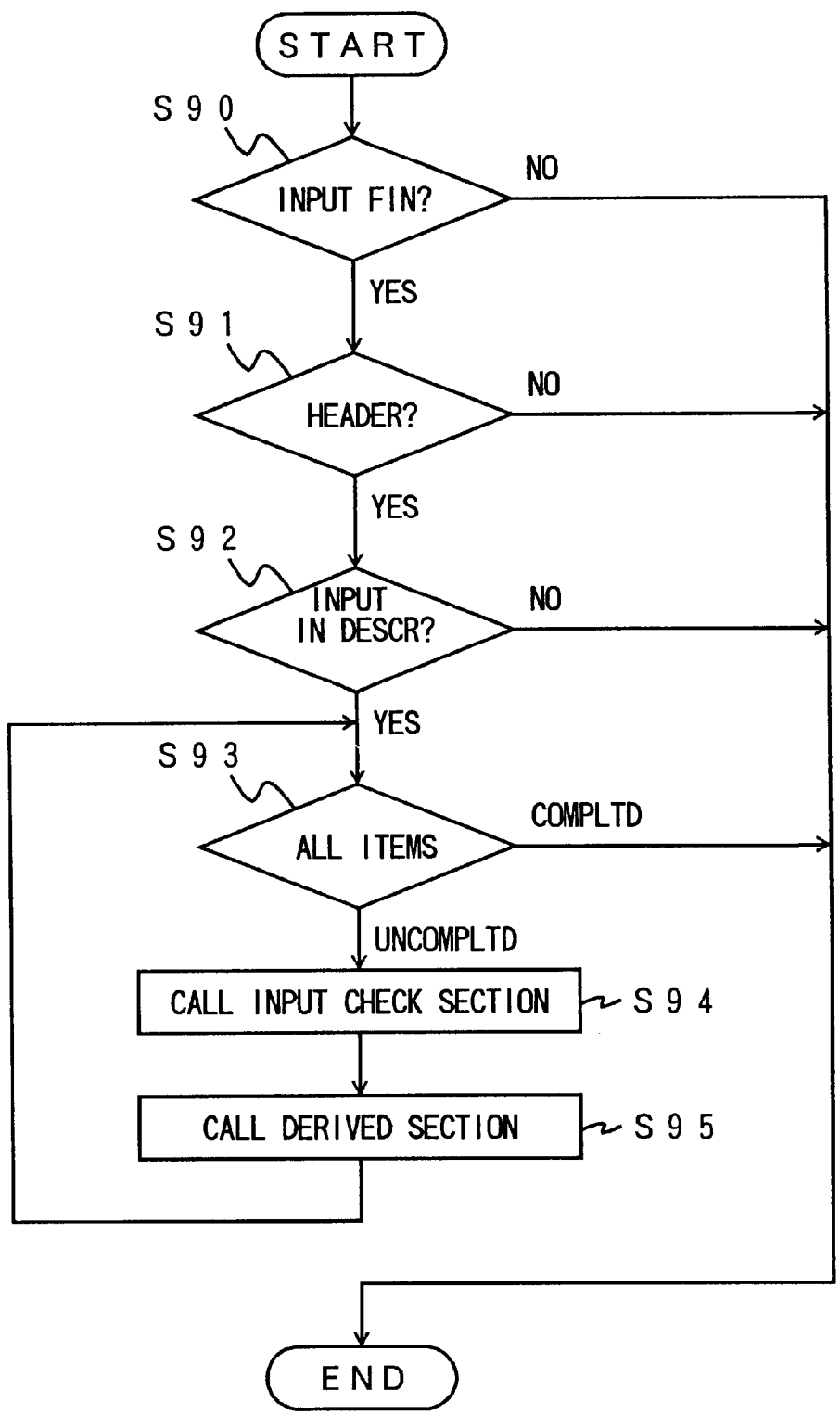

FIG. 32 shows a flowchart for the processing such as inputting or correction of the header items that is to be carried out after inputting of the description lines has been completed.

Referring to FIG. 32, a step S90 is carried out for examining whether or not there occurred a low-level event indicative of completion of the inputting, and if the result of the step S90 is YES, steps S91–95 are carried out. When the result of the step S90 is NO, the process is immediately terminated.

In the step S91, an examination is made whether or not the input data item is the one for the header or not. If the result is YES, the step S92 is carried out, while if the result is NO, the process is terminated. In the step S92, it is further examined whether or not there are already input data in the description lines, and if the result is YES, the processing is continued, while if the result is NO, the process is immediately terminated.

In the step S93, an examination is made whether or not the processing is completed for all of the data items in the description lines, and if the result is YES, the process is terminated immediately. If the result is NO, on the other hand, the step S94 and the step S95 are carried out for each of the data items in the description lines. Thus, in the step S94, an input check section corresponding to the current data item is called if there is any such input check section included in the event-driven routine for the selected data item, and a processing corresponding to the software component for the selected data item is carried out for the currently selected data item in the form of the event-driven routine. Further, in the step S95, a derived section which is derived from the current data item is called, provided that there is any such data item in the corresponding event-driven routine, and a processing for the application program is carried out for the current data item. Next, the process returns to the step S93, and the steps S94 and 95 are repeated until all the data items in the description lines are processed.

(f) MOVEMENT OF CURSOR BETWEEN DESCRIPTION LINES

When a database is read into a data item located at the upper part of the description lines, the content of the data items following thereto are generally influenced by the content of the record of the database. When processing a form that includes such a data item that reads the database, it is necessary to re-read the database when the cursor is moved between the description lines for correction of the content.

In such a case, the conversion unit 433 carries out an input emulation process, in response to the movement of the cursor for inputting data, starting from the top data item in the description lines and proceeding consecutively to the subsequent data items, before executing the input check section to evaluate the content of the data item by input check event for that data item. More specifically, an event is created for each of the data items as if there has been an input from the screen, and processes such as validity check of the data by means of the input check section, re-calculation of the derived data items by means of the derived section, or re-reading of database, are carried out. After such an emulation process has been completed, the input data is transferred to the event processing routines realized by the software component for that data item.

Figure 33:
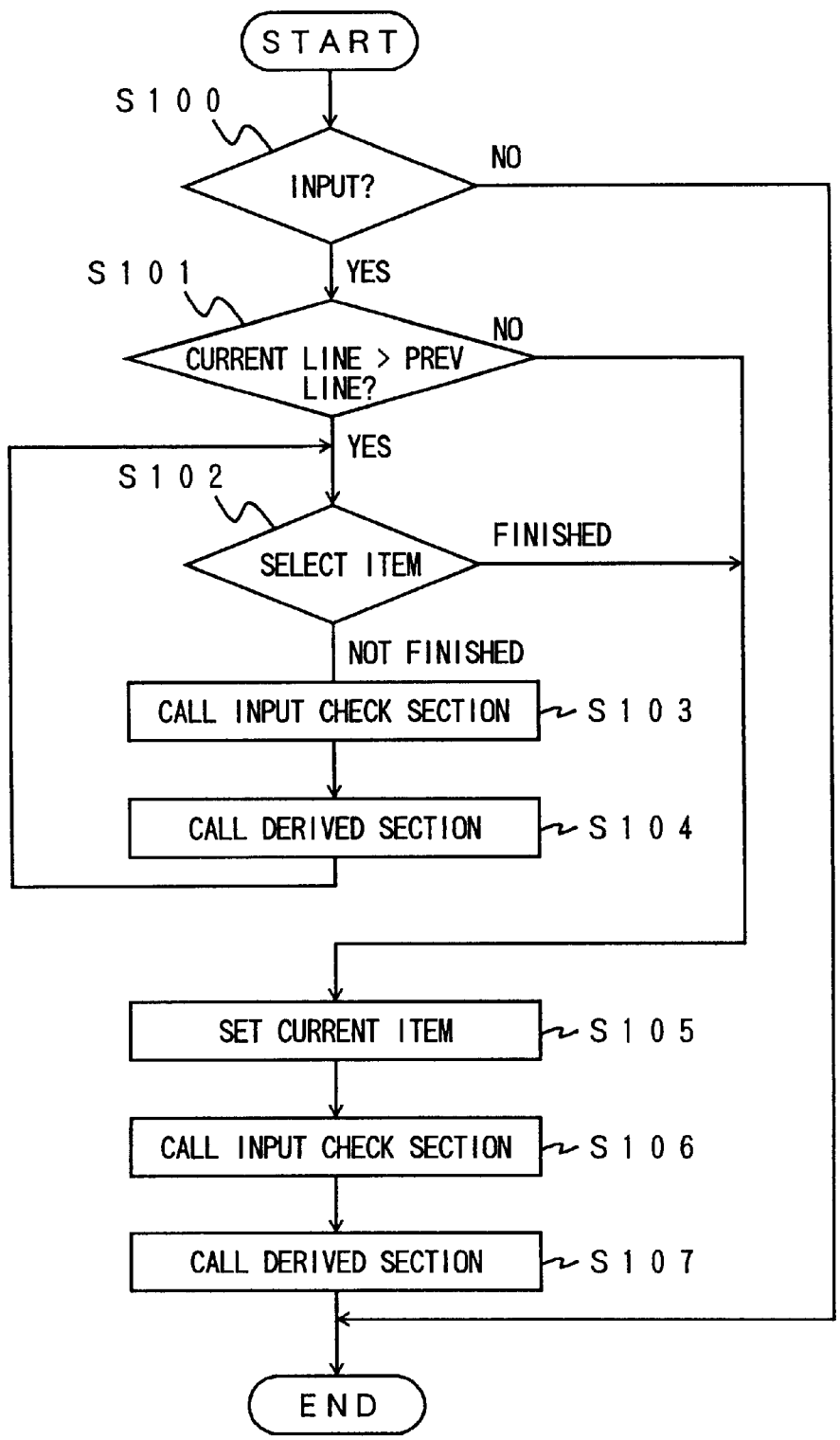

FIG. 33 shows the flowchart for cursor movement processing described above.

Referring to FIG. 33, an examination is made whether or not there has been an input of data in a step S100, and if the result is YES, steps S101–S107 to be described are carried out. If the result is NO, on the other hand, the processing is terminated.

In the step S101, a comparison is made between the line number that is newly inputted and the line number that has been previously inputted. If the newly inputted line number is older than the previously inputted line number, the process of the step S105 is carried out. On the other hand, if the newly inputted line number is younger than the previously inputted line number, the process of the step S102 is carried out.

In the step S102, all the data items older than the current data item are selected one by one, and for each of the data items thus selected, the steps S103 and S104 are carried out, wherein in the step S103, the input check section defined for the current data item is called and the processing for the application software is carried out. In the step S104, on the other hand, the derived section that is derived from the current data item is called, and the processing for the application software is carried out for the data items that is influenced by the current data item. The steps S103 and S104 are repeated until it is judged in the step S102 that all the data items preceding the current data item of the current line are processed, and after this, the process proceeds to the step S105.

Further, in the step S105, the content of the current data item, which may have been modified as a result of the derived processings, is now reset to the correct data content. In the step S106, the input check section defined for the current data item is called, and the processing for the application software with regard to the current data item is carried out. Further, in the step S107, the derived section derived from the current data item is called and the related processing of the application software is carried out.

(g) SKIP IN A FOCUSING-IN PROCESS

In the present invention, it is possible to describe the focusing-in section in the form of event-driven routines 451, in addition to the foregoing input check sections and derived sections. In such a focusing-in section represented in the form of the event-driven routines, a call is made for the focusing-in section in response to a high-level event of focusing-in.

There are cases wherein the focusing-in event is included in the data items. In such a case, the content of the data item is predetermined based upon the timing of focusing-in and there is no need for an operator to enter input. In such a case, the conversion unit 433 creases a high-level event, in response to the skipping (forced focusing-out) of the selected data item, by regarding the value of the data already set in the selected data item as the one inputted from the screen. In response to the high-level event thus created, the input check section carries out the checking of content of data items, calculation of the data items derived by the derived sections, re-reading of database, and the like. Thus, in the focusing-in section, one can describe the automatic setting of the content and skipping of the input for the data items.

When an error is detected, the forced focusing-out is canceled. On the other hand, when no error has been detected, a next data item is focused-in as indicated in the steps S13 and S15 of FIG. 25.

(h) SIMULTANEOUS MODIFICATION OF PLURAL DATA ITEMS

In this case, too, an input emulation is employed, wherein the process of simultaneous modification of data items is employed for increasing the response speed of the system. In operation, a high-level event is created as if one data item is inputted at a time, wherein such an input emulation is carried out for all of the data items that accept data input.

Figure 34:
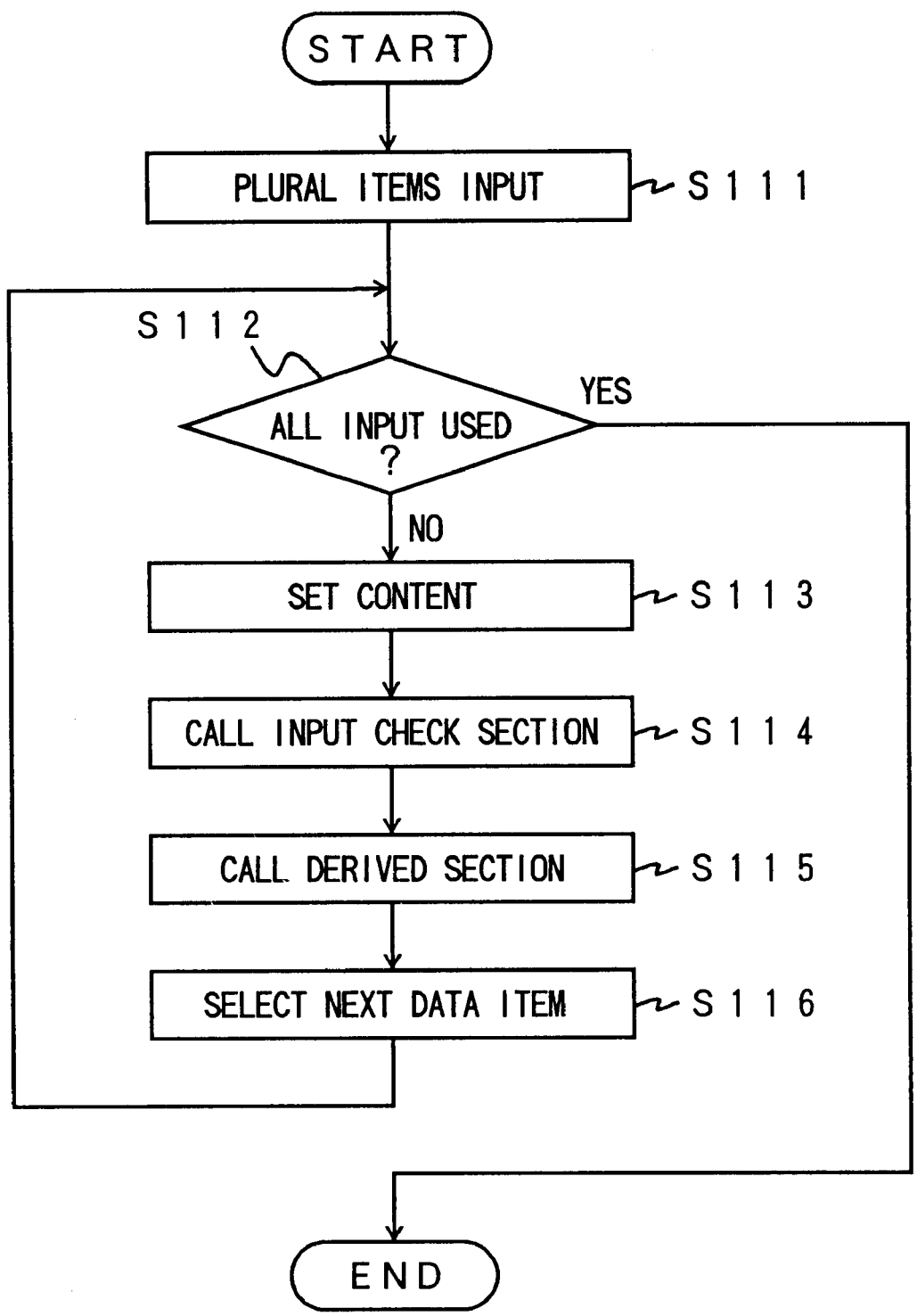

FIG. 34 shows a flowchart of the process for modifying a plurality of data items simultaneously.

Referring to FIG. 34, input is made on the screen in correspondence to a plurality of data items in a step S111. Further, a step S112 is conducted for selecting one of the data items that appear in the step S112 as a current data item. Thus, in the step S113, the input content that has been entered in the step S111 is set to the current data item selected in the step S112. In the step S114, the input check section is called, wherein a processing defined by the application software is carried out against the current data item. In the following step S115, a derived section is called when such a derived section is defined for the current data item, and a derived processing defined by the application software is carried out against the current data item. Further, the cursor is moved to a next data item, and the data item thus selected is defined as the current data item. After the step S116, the process returns to the step S112 wherein an examination is made whether or no all the data items are processed already. If the result is YES, the process is terminated immediately, while when the result is NO, the steps S113–S116 are carried out repeatedly, until all the data items are processed.

Hereinafter, the process for converting a low-level event to the initialization event, which is a high-level event, will be described briefly. One can achieve an initialization at any desired moment by defining an initialization section for each of the data items by using the INIT SECTION statement and calling the INIT SECTION statement as necessary. Such an initialization may include the process for setting the content of the data item to the state of no data entry and the process for setting a predetermined initializing content in the selected data item. Any of these processes may be achieved by calling the INIT SECTION.

(i) OPEN A SCREEN

In response to the occurrence of a low-level event for opening a screen, an initialization process is activated for all of the data items. In such an initialization process, the conversion unit 433 calls the initialization section for those data items that include definition of event-driven routine of initialization. On the other hand, those data items that does not include the definition of the event-driven routine for initialization, the standard event-driven processing unit 46 is activated for setting the data item to the state of no data entry. Further, when an initial data is entered to a data item, the conversion unit 433 and the control unit 44 are activated for carrying out the derived processes for the currently selected data item. Further, all the data items of the description lines are set to the state of no data entry.

(j) RE-DISPLAY AFTER CLEARING A GROUP

When an operator issues an instruction for clearing a group such as sub-screens, description lines and the tail areas, all the data items are initialized for the description line that is pointed by the cursor. Thus, an initialization event is created and the initialization section in the event driven routines 451 are called in response to the event thus crated. Further, the data items that does not contain the initialization section are set to the state of no data entry by means of the standard event-driven processing unit 46. Furthermore, the data items that are inputted with the initial value are subjected to the control of the conversion unit 433 and the control unit 44 and the derives processes are carried out.

(k) RE-DISPLAY AFTER CLEARING ITEMS

When an operator issues an instruction to clear a particular data item, the selected data item is subjected to the initialization process. Thus, an initialization event is created and the event-driven routine or initialization section 451 is called. Further, those data items that lacks the initialization are set to the state of no data entry by means of the standard event-driven processing unit 46. Further, in the case that an initial data is entered to the selected data item, those data items derived from the selected data item are processed under control of the processing unit 33 and the derived control unit 44.

Figure 35:
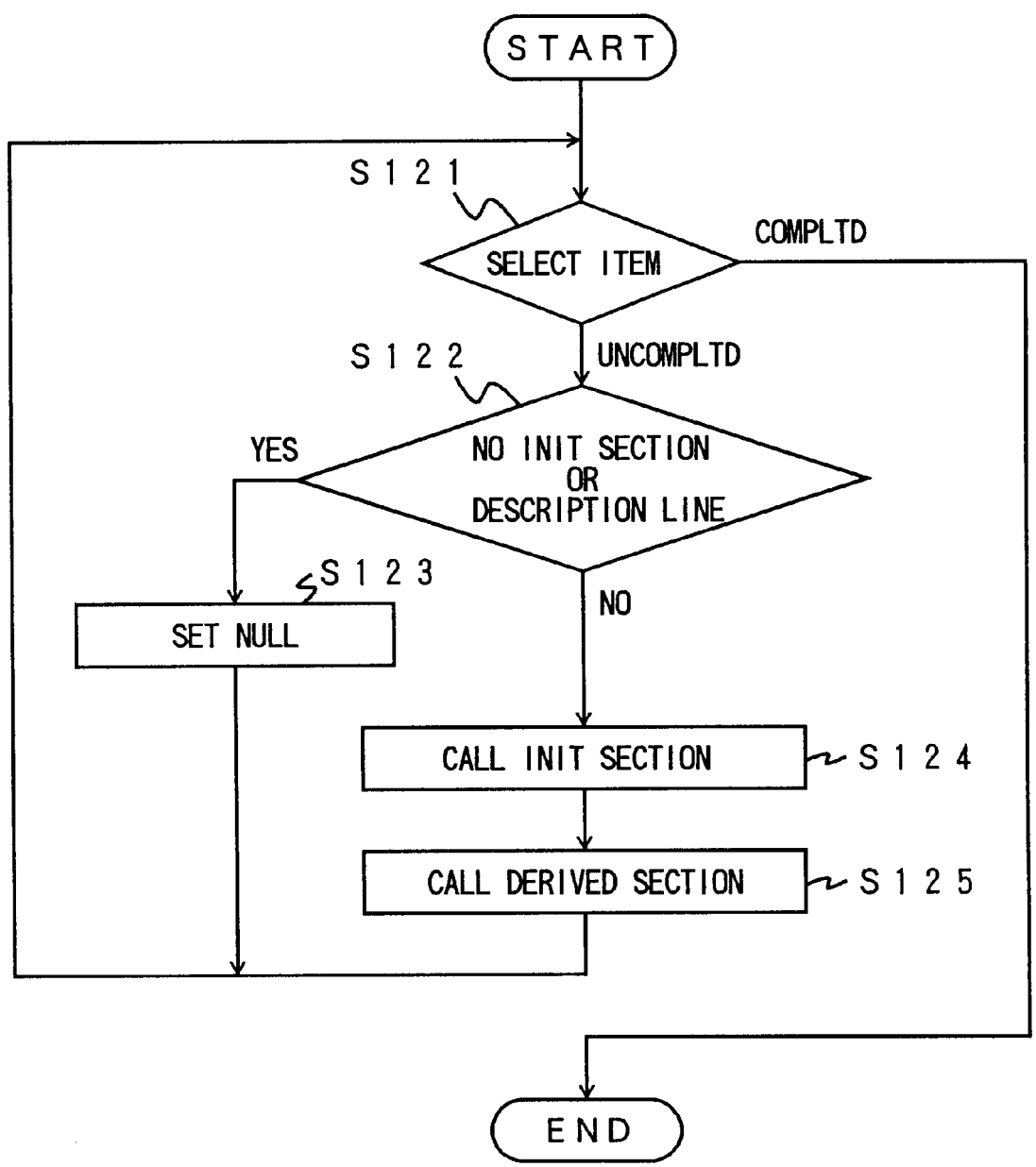

FIG. 35 shows the foregoing processes (i)–(j). In the description hereinafter, only the process of (j) will be described as an example of the processing.

Referring to FIG. 35, a data item is selected in a step S121, wherein steps S122–S125 following the step S121 are carried out for the selected data item selected in the step S121. When there is no pertinent data item in the step S121, the process is immediately terminated. Otherwise, a further discrimination is made in the step S122 for examining whether or not the selected data item is included in the description lines. If the result is YES, the step S123 is carried out, wherein an initial content NULL indicative of the state of no data entry is set in the selected data item and the process returns to the step S121. On the other hand, the step S124 is carried out when the result of examination in the step S122 is NO, wherein an initialization is applied to the selected data item by calling the initialization section defined for the selected data item. Further, the step S125 is conducted subsequently to the step S124 wherein a derived process is carried out by calling a derived section, provided that the current data item includes the definition of the derived sections derived from the currently selected data item. After this, the process returns to the step S121.

(l) CURSOR MOVEMENT TO UNINPUTTED DESCRIPTION LINES

The description lines are initialized upon movement of the cursor to a next cursor, wherein all the data items in the description lines are initialized. Thus, the initialization event is created for all of the data items in the description lines by calling an initialization section forming an event-drive routine 451. Further, the data items that does not include the definition of initialization section are set to the state of no data entry by means of the standard event-driven processing unit 46. Further, the derived processings of the derived data items are executed by calling the event conversion unit 433 and the derived control unit 44, for those data items that are inputted with initial data.

Figure 36:
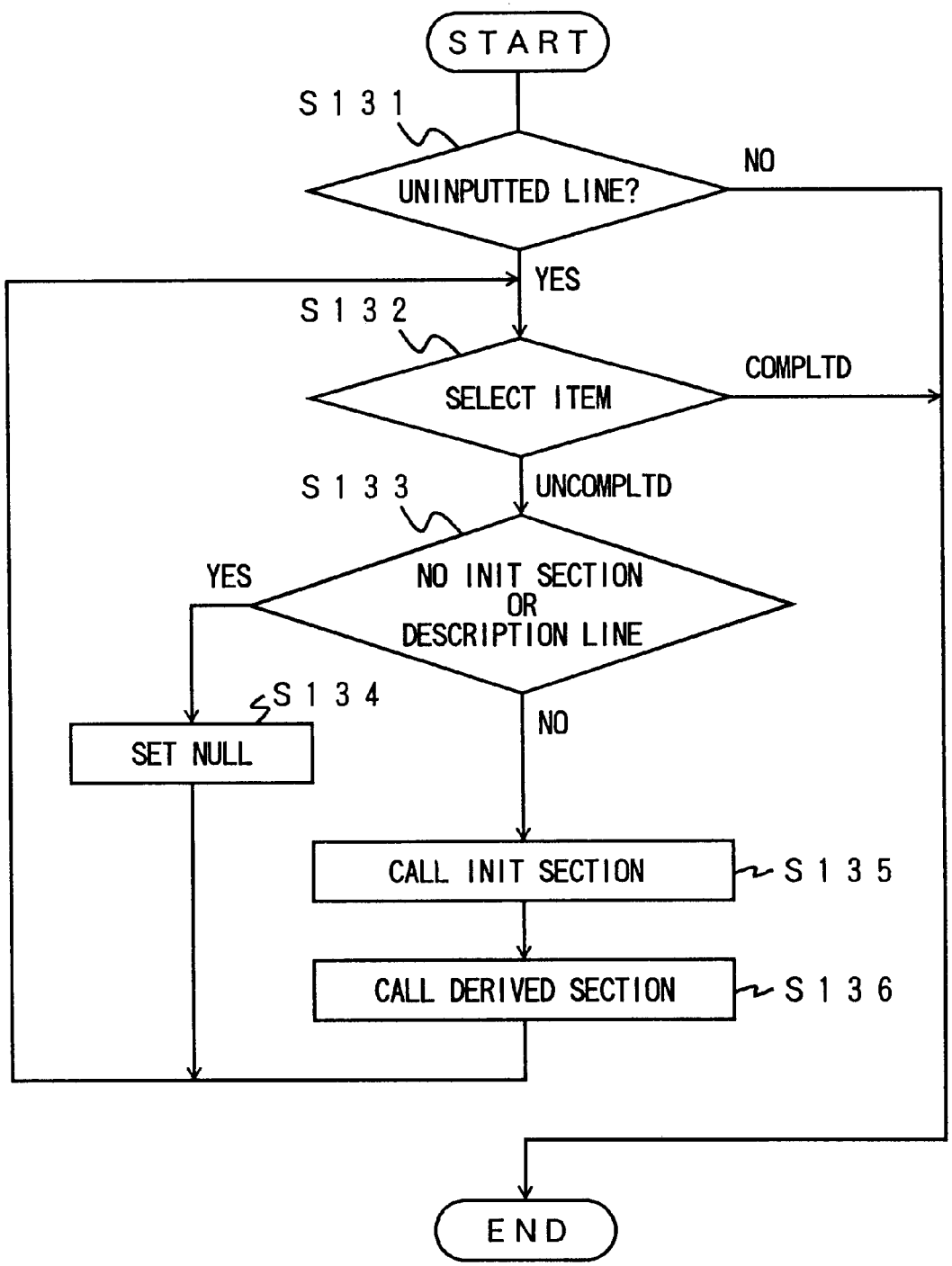
Figure 37:
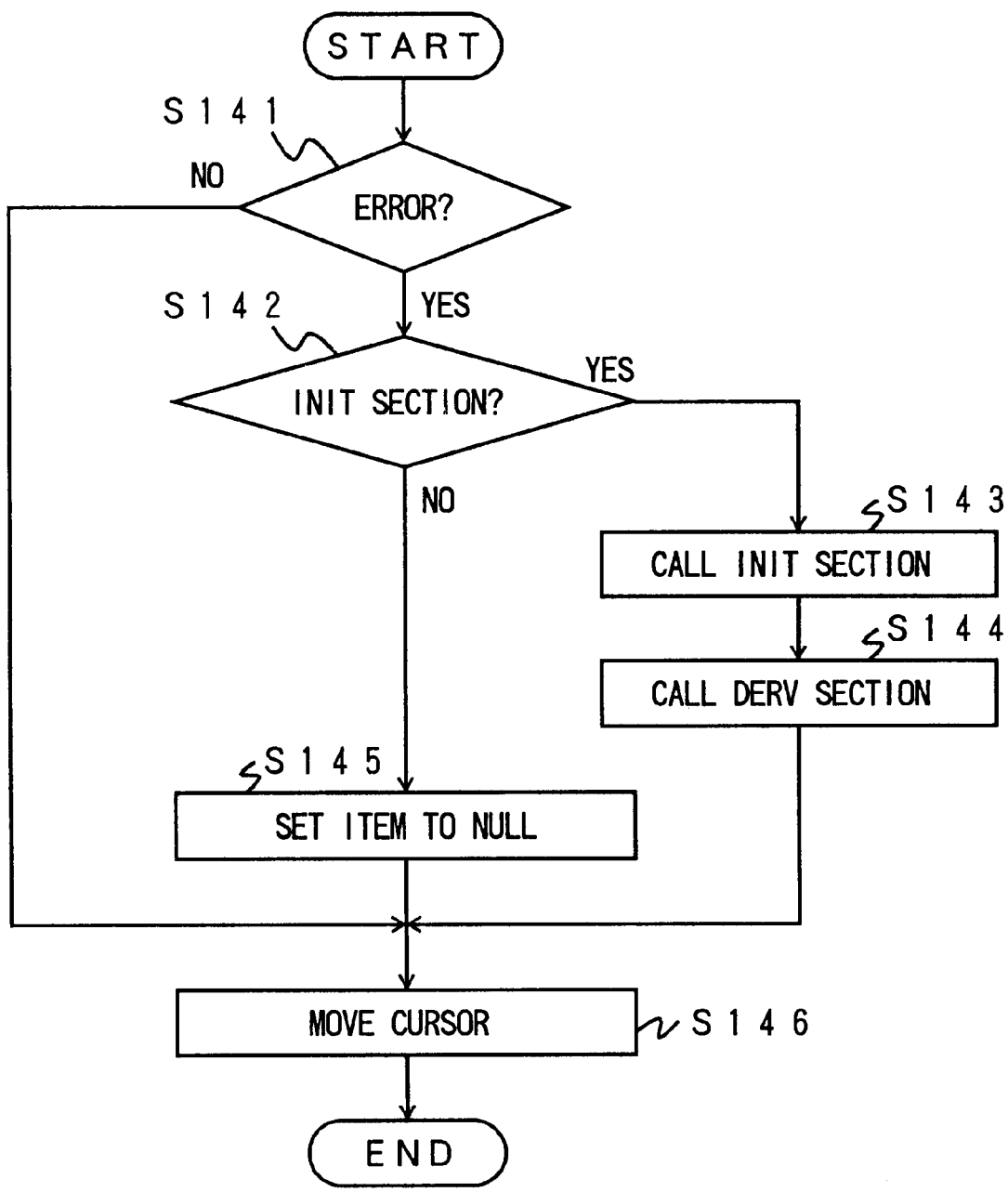

FIG. 36 shows the foregoing cursor movement process in the form of a flowchart, wherein the process of FIG. 36 corresponds to the step S36 of FIG. 26.

Referring to FIG. 36, an examination is made in a step S131 whether or not the currently selected line includes the data items in the state of no data entry, and if the result is YES, a step S132 as well as steps S133–S136 are carried out. Each of the steps S132–S136 is identical with the corresponding step in the step 121–125 of FIG. 35. Thus, further description of the content of the steps will be omitted.

(m) CURSOR MOVEMENT AFTER OCCURRENCE OF ERROR

When one wishes to move a cursor from a data item after an error has occurred in that data item, it is necessary to initialize the data item by the event conversion unit 43 so as to neutralize the error. Thus, when the data item includes a definition of initializing section or routine 451 for an event-driven initialization process, an initialization event is created and the initialization section is called. On the other hand, those data items that lack the definition of the initialization sections are set to the state of no data entry by the standard event processing unit 46. Further, the event conversion unit 433 and the control unit 44 are activated for executing the derived processes when an initial content is inputted to the data items. Furthermore, the occurrence of the error is notified to the event control unit 43 from the event-driven routine such as the input check section 51 in the form of a flag.

FIG. 36 shows a flowchart of movement of the cursor after the occurrence of an error, wherein the process is carried out in the step S14 of FIG. 25.

Referring to FIG. 36, an examination is made in a step S141 whether or not there is an error. In the result is YES, a step S142 is carried out, while when the result is NO, a step S146 is carried out.

In the step S142, an examination is made whether or not the selected data item includes a definition of an initialization section, and if the result is YES, a step S143 is carried out while if the result is NO, a step S145 is carried out, wherein an initialization section is called in the step S143.

After the step S143, a derived section is called in a step S144, provided that there is defined a derived section derived from the currently selected data item. After this, the process proceeds to the step S146. Further, the data item is set with the content NULL in a step S145 when the result of the step S142 is NO, indicating that there is no initialization sections. Further, the cursor is moved to the next data item in the step S146.

As described heretofore with reference to various embodiments, the present invention converts a low-level, physical event to a corresponding high-level, logic event by means of the event conversion unit 433, wherein the event conversion unit 433 produces four different high-level events of: (a) initialization event; (b) input check event; (c) derived event; and (d) focusing-in event, wherein these high-level events activate the event-driven processes 451 that represent the software component of the application software. In each of the event driven processes 451, the event driven processes are defined in the form of initialization section, input check section, derived section and focusing-in section. By calling such event-driven sections in response to the high-level event, one can realize entire processing necessary for office activities such as accounting, while using the same control mechanism that issues a call to these various sections.

Further, the present invention is not limited to the embodiments described heretofore, but various variations and modifications may be made without departing from the scope of the invention.

What is claimed is:

1. A processing system comprising:

software for processing a plurality of data items representing the smallest logically meaningful data unit, said software being formed of a plurality of software components and a control program responsive to high level events corresponding to an occurrence of a particular state in a data item;

input/output means for accepting input and displaying output data, said input/output means creating low level events, dependant upon a particular hardware upon which said input/output means resides, in response to input by an operator;

storage means for storing the plurality of software components, each software component being related to a particular data item processed by said software, each software component being activated in response to a corresponding event;

control means activated in response to an occurrence of an event, specifying a software component to be executed in response to the event;

processing means for executing the specified software component subsequent to the corresponding event, said processing means transferring the result of executing the selected software component to said input/output means as output data; and said control means including:
a first table representing a relationship between an event and a software component corresponding to the event;

a second table representing a relationship between a first software component and a second software component to be executed after a completion of execution of the first software component; and event conversion means that converts the low level events created by said input/output means to a high level event such that the high level event does not depend upon the content of an event created by said input/output means or upon the particular hardware upon which said input/output means resides whereby the software components may be utilized without direct dependance upon low level events.

2. A processing system as claimed in claim 1, wherein high level events include an occurrence of a particular relationship between data items.

3. A processing system as claimed in claim 1, wherein a software component comprises a plurality of software elements, each software element having a relationship to the data item to which said software component has an exclusive relationship.

4. A processing system as claimed in claim 1, wherein said software further being formed of utility components used by the plurality of software components, said storage means stores one or more utility components separately and independently of the software components.

5. A processing system as claimed in claim 1, wherein said storage means further separately stores a type file that specifies a data type for each of said data items, each of the software components carrying a designation that designates a data type in the type file in correspondence to the data item of the software component.

6. A processing system as claimed in claim 1, wherein said storage means further stores a sample software component and a substituting software component for causing a substitution of characters into the sample software component, the substituting software component creating a software component in an executable form.

7. A processing system as claimed in claim 1, wherein said control means includes conversion means for converting data having indices to data having no indices when executing a software component.

8. A processing system as claimed in claim 4, wherein a utility component includes an event driven routine activated by a corresponding event.

9. A processing system as claimed in claim 4, wherein said storage means further stores a set of parameters for designating a mode of operation of the processing system, separately and independently to said software components and said utility components.

10. A processing system as claimed in claim 6, wherein the substituting software component automatically creates an executable software component in the absence of a necessary software component.

11. A processing system as claimed in claim 7, wherein said control means includes derived process control means for activating, in response to a high level event, a software component for a data item derived from the data item corresponding to the high level event.

12. A processing system as claimed in claim 8, a wherein a utility component comprises a software routine that checks for the validity of a content between a plurality of said data items.

13. A processing system as claimed in claim 9, wherein the set of parameters control the mode of operation of said input/output means.

14. A processing system as claimed in claim 9, wherein the set of parameters control the mode of updating data of said storage means.

15. A processing system as claimed in claim 9, wherein the set of parameters specify a hardware configuration of said processing system.

16. A processing system as claimed in claim 11, wherein said event conversion means creates an input check event, as a high level event, in response to a setting of data in a current date item and causes said control means to activate a software component for checking the validity of said data in said current data item.

17. A processing system as claimed in claim 16, wherein said event conversion means further creates a derived event, as a high level event, in response to a setting of data in said current data item and causes said derived process control means to activate a software component of a data item of which content is influenced by the content of said current data item.

18. A processing system as claimed in claim 16, wherein said event conversion means creates an input check event as a result of a search process, such that the input check event is created in response to the setting of data in the current data item as a result of said search process.

19. A processing system as claimed in claim 16, wherein said event conversion means creates an input check event as a result of a copying process, such that the input check event is created in response to the setting of data in the current data item as a result of said search process.

20. A processing system as claimed in claim 16, wherein the setting of data in the current data item is achieved by an input emulation process that sets data in the current data item as if the data is inputted from said input/output means.

21. An event driven processing system comprising:

an input unit that receives input from a user and issues events in response thereto;

a storage unit storing application software comprising a plurality of software elements, including item related software elements related to a single data item, the item related software elements being responsive to events;

an execution unit that executes the software elements and, upon completion of the execution of a software element, issues a notification of the completion;

a first table cross-referencing events to software elements to be executed in response to issuance of the events;

a second table cross-referencing software elements to other software elements to be executed upon the completion of a software element; and a selection routine that receives events along with the notifications from the execution unit, the selection routine accessing the first and second tables to select software elements to be executed in response to the received events and notifications.

22. An event driven processing system, as set forth in claim 21, wherein the events issued by the input unit are low level events.

23. An event driven processing system, as set forth in claim 21, wherein the events to which the item related software elements are responsive include high level events issued in response to a state transition of a data item or a value of a data item.

24. An event driven processing system, as set forth in claim 21, wherein:

the selection routine, upon receipt of an event accesses the first table using an identification of the received event and provides indications of the software elements to be executed to the execution unit; and the selection routine, upon receipt of a notification of completion from the execution unit, accesses the second table and using an identification of the completed software element and provides indications of the software elements to be executed to the execution unit.

25. An event driven processing system, as set forth in claim 22, further comprising:

a conversion unit to convert low level events to high level events.

26. An event driven processing system, as set forth in claim 24, wherein the selection routine places the indications of the software elements to be executed into a queue on either a depth first basis or a width first basis.

\* \* \* \* \*

UNITED STATES PATENT AND TRADEMARK OFFICE
CERTIFICATE OF CORRECTION

PATENT NO.: 6,035,343
DATED : March 7, 2000
INVENTOR(S): Yasuhito TSUSHIMA et al.

It is certified that error appears in the above-identified patent and that said Letters Patent is hereby corrected as shown below:

On the title page, [56] References Cited, Foreign Patent Documents, change "14-057335" to 64-057335--.

Col. 33, line 61, after "claim 8" delete "a".

Signed and Sealed this

Third Day of April, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

| | |
|---|---|
| PATENT NO. | : 6,035,343 |
| DATED | : March 7, 2000 |
| INVENTOR(S) | : Yasuhito Tsushima et al. |

It is certified that error appears in the above-identified patent and that said Letters Patent is hereby corrected as shown below:

Please correct the title page to include:

[30]   Foreign Priority Data
Japanese Patent Application No. 5-140232
Filed: June 11, 1993
Japanese Patent Application No. 5-299364
Filed: November 30, 1993

Signed and Sealed this

Twenty-third Day of October, 2001

Attest:

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,035,343
DATED         : March 7, 2000
INVENTOR(S)   : Yasuhito Tsushima et al.

It is certified that error appears in the above-identified patent and that said Letters Patent is hereby corrected as shown below:

<u>Title page,</u>
After Item [21], insert:
--      [30]   Foreign Priority Data
        Japanese Patent Application No. 5-140232
        Filed: June 11, 1993
        Japanese Patent Application No. 5-299364
        Filed: November 30, 1993 --

Signed and Sealed this

Seventeenth Day of December, 2002

JAMES E. ROGAN
*Director of the United States Patent and Trademark Office*